United States Patent
Bhaskaran et al.

(10) Patent No.: US 12,408,076 B2
(45) Date of Patent: Sep. 2, 2025

(54) SCALING SUBSCRIBER HANDLING CAPACITY AND THROUGHPUT IN A CLOUD NATIVE RADIO ACCESS NETWORK

(71) Applicant: Rakuten Symphony, Inc., Tokyo (JP)

(72) Inventors: Sridhar Bhaskaran, Bangalore (IN); Praveen Kumar Alur Shivaswamy, Bangalore (IN); Venkatarao Malempati, Bangalore (IN); Rohan Harihara Iyer, Bangalore (IN); Bhanu Prakash Pillala, Bengaluru (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/782,009

(22) PCT Filed: May 27, 2022

(86) PCT No.: PCT/US2022/031362
§ 371 (c)(1),
(2) Date: Jun. 2, 2022

(87) PCT Pub. No.: WO2023/191830
PCT Pub. Date: Oct. 5, 2023

(65) Prior Publication Data
US 2024/0163723 A1 May 16, 2024

(30) Foreign Application Priority Data
Apr. 1, 2022 (IN) .............................. 202241020000

(51) Int. Cl.
*H04W 28/084* (2023.01)
*H04L 41/0806* (2022.01)
(Continued)

(52) U.S. Cl.
CPC ....... *H04W 28/084* (2023.05); *H04L 41/0806* (2013.01); *H04W 8/18* (2013.01); *H04W 24/02* (2013.01)

(58) Field of Classification Search
CPC ..... H04W 28/084; H04W 8/18; H04W 24/02; H04W 76/27; H04L 41/0806; H04L 41/0897; H04L 43/16; H04Q 11/02
See application file for complete search history.

(56) References Cited

U.S. PATENT DOCUMENTS 10,334,468 B2 * 6/2019 Salot ................. H04W 28/0273
10,499,413 B2 * 12/2019 Nguyen .............. H04W 72/566
(Continued)

FOREIGN PATENT DOCUMENTS

JP 2019-204298 A 11/2019

OTHER PUBLICATIONS

International Search Report and Written Opinion for Intl. App. No. PCT/US22/31362 mailed Sep. 8, 2022.
(Continued)

*Primary Examiner* — Brian T O Connor
(74) *Attorney, Agent, or Firm* — Sughrue Mion, PLLC

(57) ABSTRACT

A method, an apparatus, and a computer program product for scaling of subscriber capacity in a cloud native radio access network (RAN). A processing capacity being assigned to one or more containers in a plurality of containers of a cloud native radio access network for providing communication to at least one user equipment in a plurality of user equipments is determined. The determined processing capacity is compared to at least one predetermined threshold in a plurality of predetermined thresholds. Based on the comparing a determination is made whether to change an assignment of the processing capacity.

23 Claims, 21 Drawing Sheets

(51) Int. Cl.
*H04W 8/18* (2009.01)
*H04W 24/02* (2009.01)

(56) References Cited

U.S. PATENT DOCUMENTS

| | | | | |
|---|---|---|---|---|
| 10,567,288 | B1* | 2/2020 | Mutnuru | H04L 67/1019 |
| 10,582,392 | B2* | 3/2020 | Maguire | H04W 24/02 |
| 11,140,564 | B2* | 10/2021 | Jo | H04W 24/04 |
| 11,375,517 | B2* | 6/2022 | Bhaskaran | H04W 72/543 |
| 11,601,819 | B2* | 3/2023 | Chou | H04W 24/02 |
| 11,700,594 | B2* | 7/2023 | Bhandari | H04W 48/18 370/329 |
| 11,895,024 | B2* | 2/2024 | Xu | H04L 41/0806 |
| 11,966,784 | B2* | 4/2024 | Pathak | G06F 9/5038 |
| 12,143,928 | B2* | 11/2024 | Tov | H04W 8/005 |
| 12,335,787 | B2* | 6/2025 | Chamarty | H04W 28/18 |
| 2017/0371717 | A1 | 12/2017 | Kiess et al. | |
| 2018/0041934 | A1* | 2/2018 | Agarwal | H04L 41/122 |
| 2020/0329381 | A1* | 10/2020 | Chou | H04W 24/02 |
| 2020/0382975 | A1 | 12/2020 | Jo et al. | |
| 2020/0403872 | A1* | 12/2020 | Shivashankara | H04L 41/0897 |
| 2021/0051519 | A1* | 2/2021 | Bedekar | H04W 28/086 |
| 2021/0144517 | A1 | 5/2021 | Guim Bernat et al. | |
| 2021/0153041 | A1 | 5/2021 | Parvataneni et al. | |
| 2021/0168052 | A1* | 6/2021 | Parulkar | H04L 67/10 |
| 2021/0297347 | A1 | 9/2021 | Xu et al. | |
| 2022/0012080 | A1* | 1/2022 | Shepherd | G06F 9/45545 |
| 2022/0188211 | A1 | 6/2022 | Gupta et al. | |
| 2023/0189006 | A1* | 6/2023 | Chou | H04W 16/10 370/328 |
| 2023/0336420 | A1* | 10/2023 | Trujillo | H04L 41/0886 |
| 2023/0337055 | A1* | 10/2023 | Trujillo | H04W 28/0892 |
| 2024/0163723 | A1* | 5/2024 | Bhaskaran | H04W 28/084 |
| 2024/0163727 | A1* | 5/2024 | Chamarty | G06F 9/5011 |
| 2024/0224070 | A1* | 7/2024 | Nakazato | H04L 43/16 |

OTHER PUBLICATIONS

O-Ran Alliance, "Cloudification and Orchestration Use Cases and Requirements for O-RAN Virtualized RAN", O-RAN.WG6.ORCH-USE-CASES-v03.00, Technical Specification, 2022, pp. 1-78 (79 pages total).
Samsung, "Technical White Paper, Virtualized RAN—vol. 2", Apr. 2021, pp. 1-15 (16 pages total).
English Translation of Communication issued Apr. 22, 2025 in Japanese Application No. 2024-543878.

* cited by examiner

SCALING SUBSCRIBER HANDLING CAPACITY AND THROUGHPUT IN A CLOUD NATIVE RADIO ACCESS NETWORK

CROSS-REFERENCE TO RELATED APPLICATIONS

The present application claims priority to and is the 35 U.S.C. 371 United States National Phase application based on International Patent Application No. PCT/US2022/031362, filed on May 27, 2022, entitled "Scaling Subscriber Handling Capacity and Throughput in a Cloud Native Radio Access Network," which claims priority to Indian Patent Application number 202241020000 to Bhaskaran et al., filed Apr. 1, 2022, and entitled "Scaling Subscriber Handling Capacity and Throughput in a Cloud Native Radio Access Network", and incorporates their disclosures herein by reference in their entireties.

TECHNICAL FIELD

In some implementations, the current subject matter relates to telecommunications systems, and in particular, to scaling of subscriber capacity and/or data throughput in a cloud native radio access network (RAN), and in particular, to scaling in and/or scaling out subscriber handling capacity in the cloud native RAN.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Conventional radio access networks (RANs) are typically configured for peak wireless subscriber processing capacity demands. When processing capacity falls below a predetermined peak, RAN's compute resources become under-utilized. Cloud native RANs use cloud technologies to dynamically scale-in (or reduce) and scale-out (or increase) the processing capacity required as the subscriber demand decreases or increases. To fully utilize the cloud native dynamic scaling, a determination of when to trigger the scale in and scale out operation is required.

SUMMARY

In some implementations, the current subject matter relates to a method for scaling of subscriber capacity in a cloud native radio access network (RAN). The method may include determining a processing capacity being assigned to one or more containers in a plurality of containers of a cloud native radio access network for providing communication to at least one user equipment in a plurality of user equipments, comparing the determined processing capacity to at least one predetermined threshold in a plurality of predetermined thresholds, and determining, based on the comparing, whether to change assignment of the processing capacity.

In some implementations, the current subject matter can include one or more of the following optional features. In some implementations, the method may also include changing the assignment of the processing capacity.

In some implementations, the containers may be associated with at least one of: at least one control plane component and at least user plane component of a centralized unit of a base station. The determination of whether to change the assignment of the processing capacity assigned may include at least one of the following: increasing a number of user equipments being processed by the at least one control plane component by increasing a number of containers providing communication to the user equipments, decreasing a number of user equipments being processed by the at least one control plane component by decreasing the number of containers providing communication to the user equipments, increasing a throughout capacity of the at least one user plane component by increasing the number of containers providing communication to the user equipments, decreasing a throughput capacity of the at least one user plane component by decreasing the number of containers providing communication to the user equipments, and any combinations thereof.

In some implementations, at least one of the determining the processing capacity, the comparing, and the determining whether to change the processing capacity may be performed by at least one base station in a wireless communication system. The base station may include at least one of the following: a base station, an eNodeB base station, a gNodeB base station, a wireless base station, a wireless access point, and any combination thereof. The base station may be a base station operating in at least one of the following communications systems: a long term evolution communications system, a new radio communications system, a wireless communication system, and any combination thereof. The base station may include at least one centralized unit, the centralized unit include at least one of: a control plane component, a user plane component, and any combination thereof.

In some implementations, one or more user equipments in the plurality of user equipments may be associated with a radio resource control (RRC) status. The RRC status may include at least one of the following: an RRC-inactive status, no RRC-inactive status, an RRC connected status, and any combination thereof. One or more predetermined weights may be assigned to one or more user equipments in the plurality of user equipments based on the RRC status. At least one predetermined threshold may be selected from a plurality of predetermined thresholds based on the RRC status of one or more user equipments. The comparing may include comparing the determined processing capacity determined for one or more user equipments being assigned one or more predetermined weights to the predetermined threshold selected based on the RRC status of one or more user equipments.

In some implementations, the method may further include transitioning, based on the determining whether to change the assignment of the processing capacity, at least one user equipment assigned to at least one container to at least another container in the plurality of containers, and providing, using at least another container, communication to the transitioned user equipment. The method may also include preventing, subsequent to the transitioning, at least one container from providing communication to at least another user equipment in the plurality of user equipments. The method may also include changing at least one identifier of the transitioned user equipment. The method may further include preventing changing of at least one identifier of the transitioned equipment. The identifier may include at least one of the following: a user equipment identifier, a user equipment bearer identifier, at least one user plane endpoint address, an internet protocol (IP) address, a GPRS tunneling protocol user data tunneling endpoint identifier (GTP-U TEID), and any combination thereof associated with at least one user equipment. The identifier may be stored in at least one database. At least one container may be configured to retrieve the identifier from the database, and assign the retrieved identifier to the transitioned user equipment. The database may store a mapping between the retrieved identifier and at least one container.

In some implementations, at least one predetermined threshold may include at least one of the following: a first threshold associated with increasing the processing capacity, a second threshold associated with decreasing the processing capacity, and any combination thereof. The comparing may include comparing at least one of: one or more user equipments having with a predetermined radio resource control (RRC) status and being associated with a first predetermined weight, a number of communications from the one or more user equipments processed by the one or more containers per a predetermined period of time, a throughput associated with the one or more containers, and any combination thereof, with at least one of the first threshold and the second threshold. In some implementations, changing of the assignment of the processing capacity may include at least one of: increasing, based on the comparing, the processing capacity upon exceeding the first threshold; and decreasing, based on the comparing, the processing capacity upon not exceeding the second threshold.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

Figure 1A:
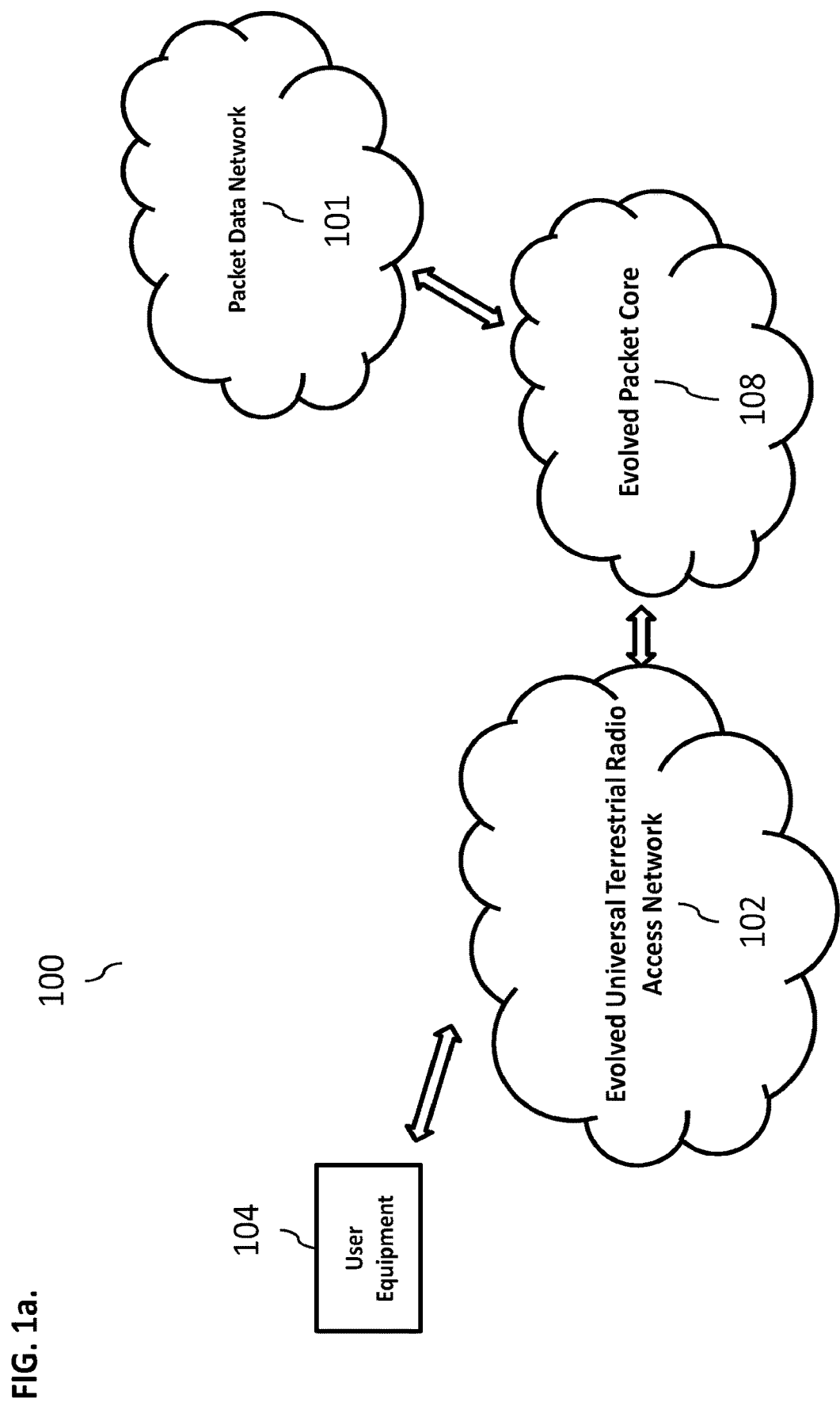
FIG. 1a illustrates an exemplary conventional long term evolution ("LTE") communications system.

The current subject matter can provide for systems and methods that can be implemented in a wireless communications system. Such systems can include various wireless communications systems, including 5G New Radio communications systems, long term evolution communication systems, etc.

In some implementations, the current subject matter relates to scaling in and/or scaling out user equipment handling capacity in a cloud native radio access network (RAN). Such scaling of user equipment capacity may be performed while user equipments may include and/or might not include a radio resource control (RRC) inactive status.

In some exemplary implementations, the current subject matter may be configured to implement one or more triggering mechanisms for scaling (out/in) of user equipment handling capacity in one or more portions of a base station (e.g., gNodeB/gNB, eNodeB/eNB) in a cloud radio access network communications system, where no user equipments include an RRC-inactive status.

In some exemplary implementations, the current subject matter may be configured to implement one or more triggering mechanisms for scaling (out/in) of user equipment handling capacity in one or more portions of a base station (e.g., gNodeB/gNB, ng-eNodeB/ng-eNB) in a cloud radio access network communications system, where one or more user equipments include an RRC-inactive status.

In some exemplary implementations, the current subject matter may be configured to implement one or more triggering mechanisms for scaling (out/in) of user equipment handling capacity in one or more portions of a base station (e.g., gNodeB/gNB, eNodeB/eNB) in a cloud native radio access network communications system, where one or more user equipments include an RRC-inactive status and/or do not include an RRC-inactive status, and where one or more such user equipments' status (e.g., including RRC-inactive status, not including RRC-inactive status) may be assigned one or more predetermined weights.

In some exemplary implementations, the current subject matter may be configured to implement one or more triggering mechanisms for scaling (out/in) of user equipment handling capacity in one or more portions of a base station (e.g., gNodeB/gNB, eNodeB/eNB) in a cloud native radio access network communications system, where one or more triggering mechanisms may be associated with one or more thresholds that may be used to determine when to execute the scaling (out/in) of user equipment handling capacity.

In some exemplary implementations, the assigned predetermined weights may be used in determining the above thresholds.

In some exemplary implementations, the current subject matter relates to scaling of user equipment handling capacity in in one or more control planes (CPs) of one or more centralized units (CUs) of a base station (e.g., gNodeB/gNB, eNodeB/eNB) in a cloud native radio access network (RAN).

In some exemplary implementations, the current subject matter relates to scaling of user equipment handling capacity in in one or more user planes (UPs) of one or more centralized units (CUs) of a base station (e.g., gNodeB/gNB, eNodeB/eNB) in a cloud native radio access network (RAN).

In some exemplary implementations, the current subject matter relates to scaling in and/or scaling out user equipment handling capacity in a cloud native radio access network (RAN), where the cloud native RAN is being implemented in a cloud clustered computing environment having one or more processing pods capable of processing one or more user equipments, and where, upon scaling, one or more user equipments (e.g., user equipment identifier and/or bearer context identifier) may be transitioned from one such processing pod (e.g., pod, whose capacity may have been scaled in (e.g., reduced), as discussed above) to another processing pod.

In some exemplary implementations, one or more user equipment identifiers and/or its bearer context identifier may be altered during such transitions.

In some exemplary implementations, one or more user plane endpoint address(es) that may be associated with one or more user equipments may be altered during such transitions.

In some exemplary implementations, one or more user plane endpoint address(es) may include an internet protocol (IP) address and a GPRS tunneling protocol user data tunneling endpoint identifier (GTP-U TEID).

In some exemplary implementations, one or more user plane endpoint address(es) that may be associated with one or more user equipments might not be altered during such transitions.

In some exemplary implementations, one or more of user equipments may be allocated on or more subscriber identifiers and/or bearer context identifiers from a shared database during such transitions without altering their associated user plane endpoint address(es).

In some exemplary implementations, a mapping of the subscriber identifier(s) and/or bearer context identifier(s) to the processing pod handling one or more user equipments associated with the allocated subscriber identifier(s) and/or bearer context identifier(s) may be maintained (e.g., and stored in a database). The mapping may be updated during each such transition.

In some exemplary implementations, changes in and/or allocations of the subscriber identifier(s) and/or bearer context identifier(s) during such transitions may be indicated and/or signaled to one or more peer network functions. Such signaling may include extending one or more existing messages and/or generating new messages for transmission using one or more communication interfaces (e.g., F1, W1, E1, NG, S1, Xn, X2, etc.).

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
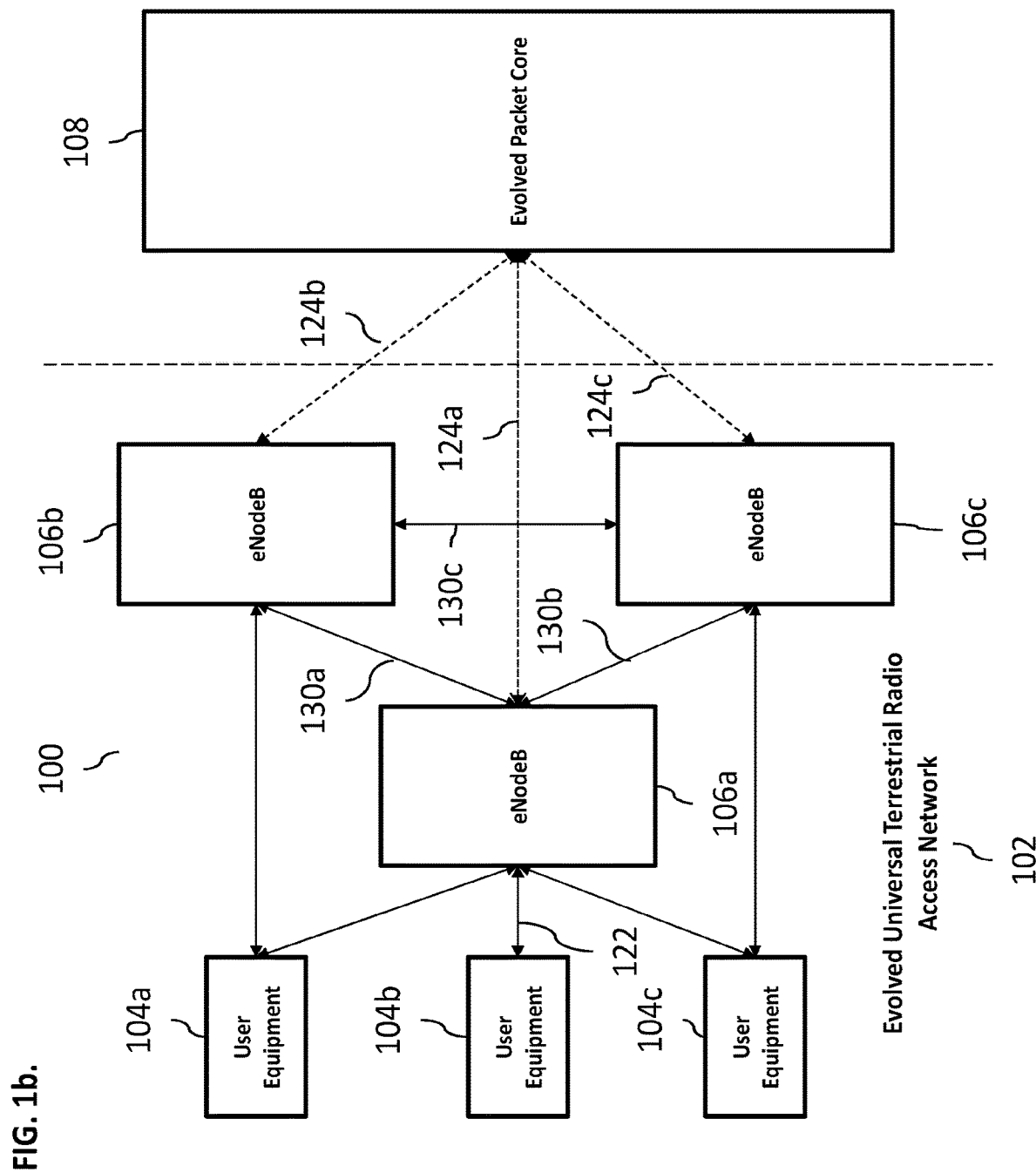

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1B) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
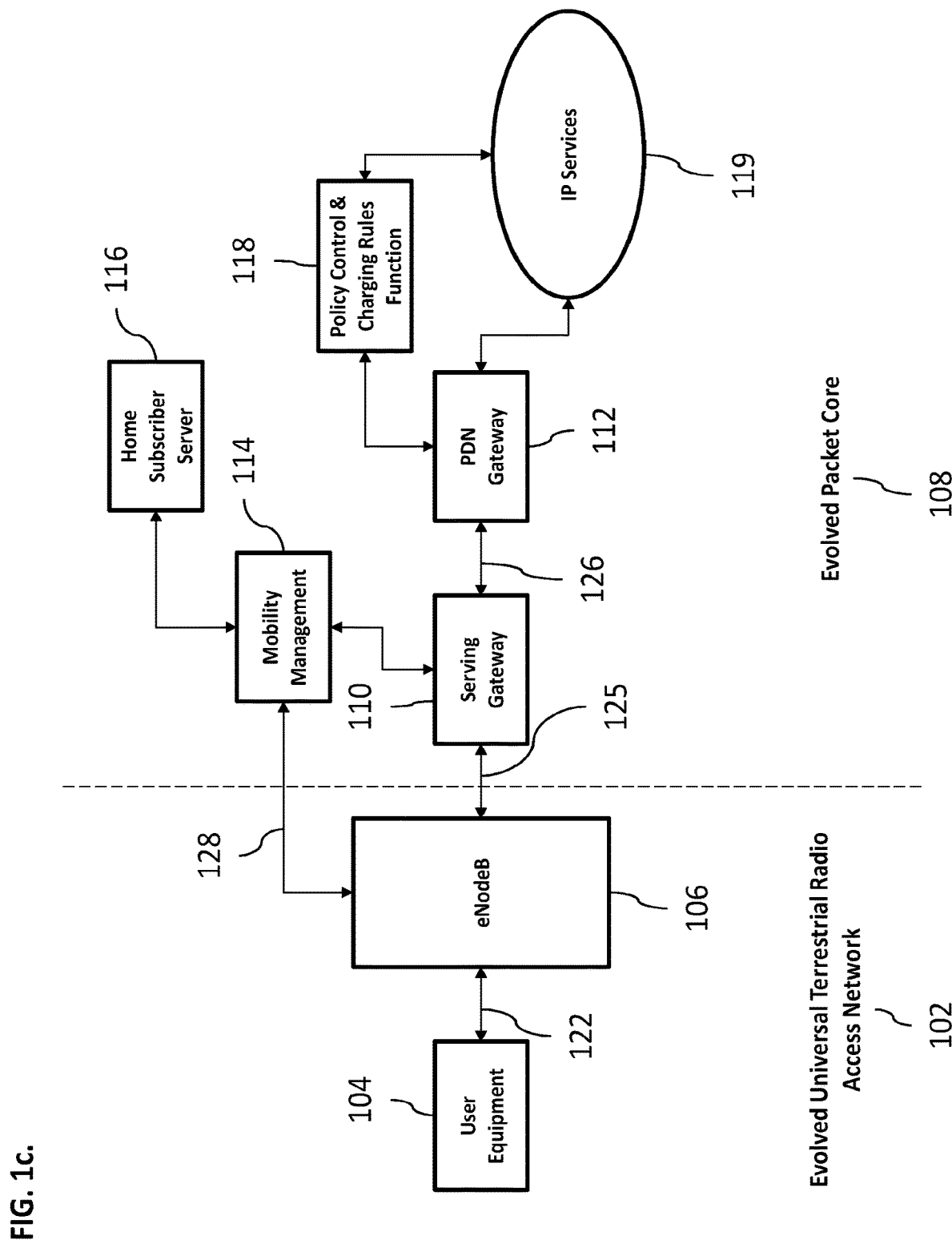

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1B, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
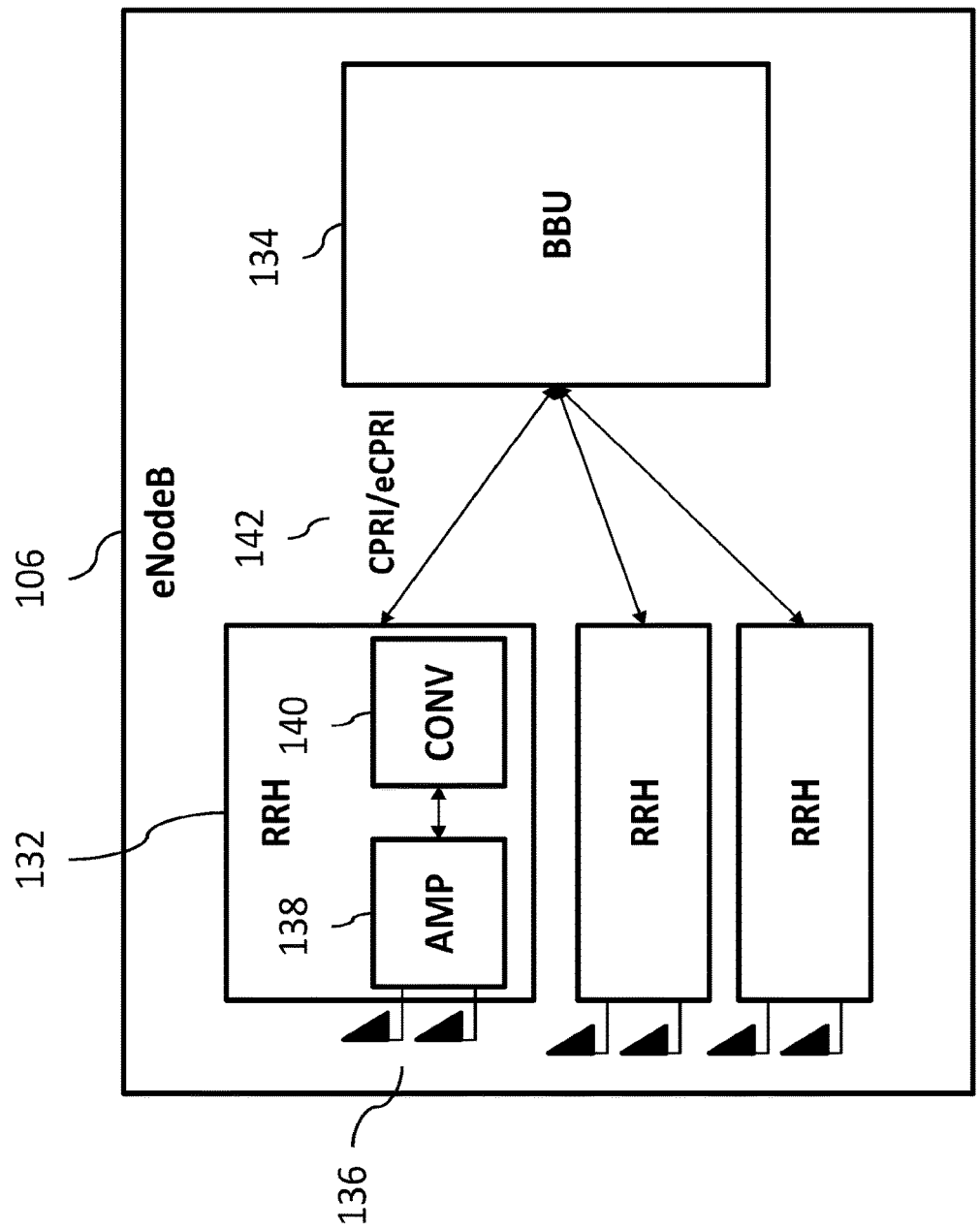

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using 0-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (downlink: single user and multi user MIMO; uplink: single user and multi user MIMO), number of sectors (6 maximum), maximum transmission rate (downlink 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONN") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONY 140) to digital baseband signals for transmission to the BBU 134.

Figure 2:
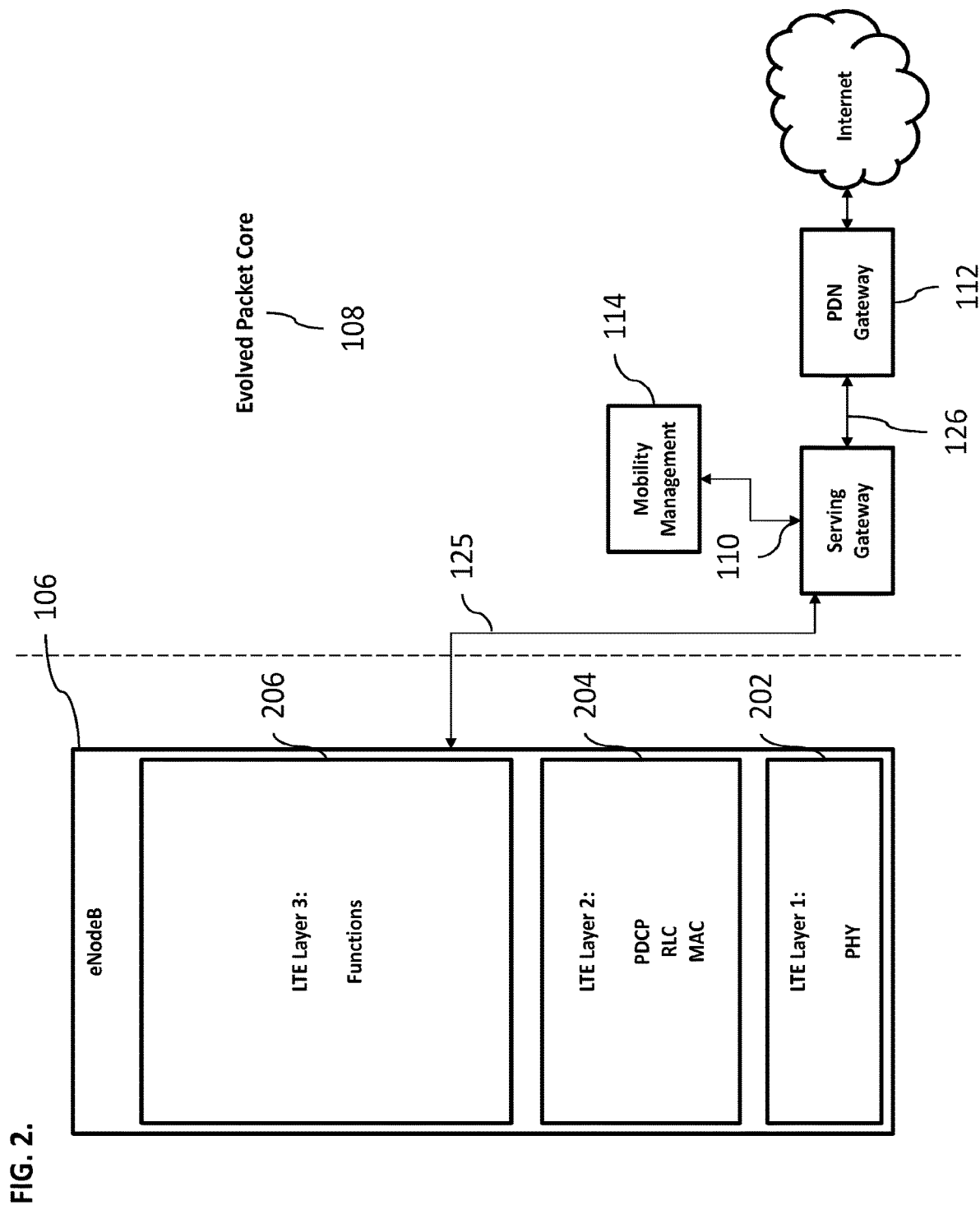
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
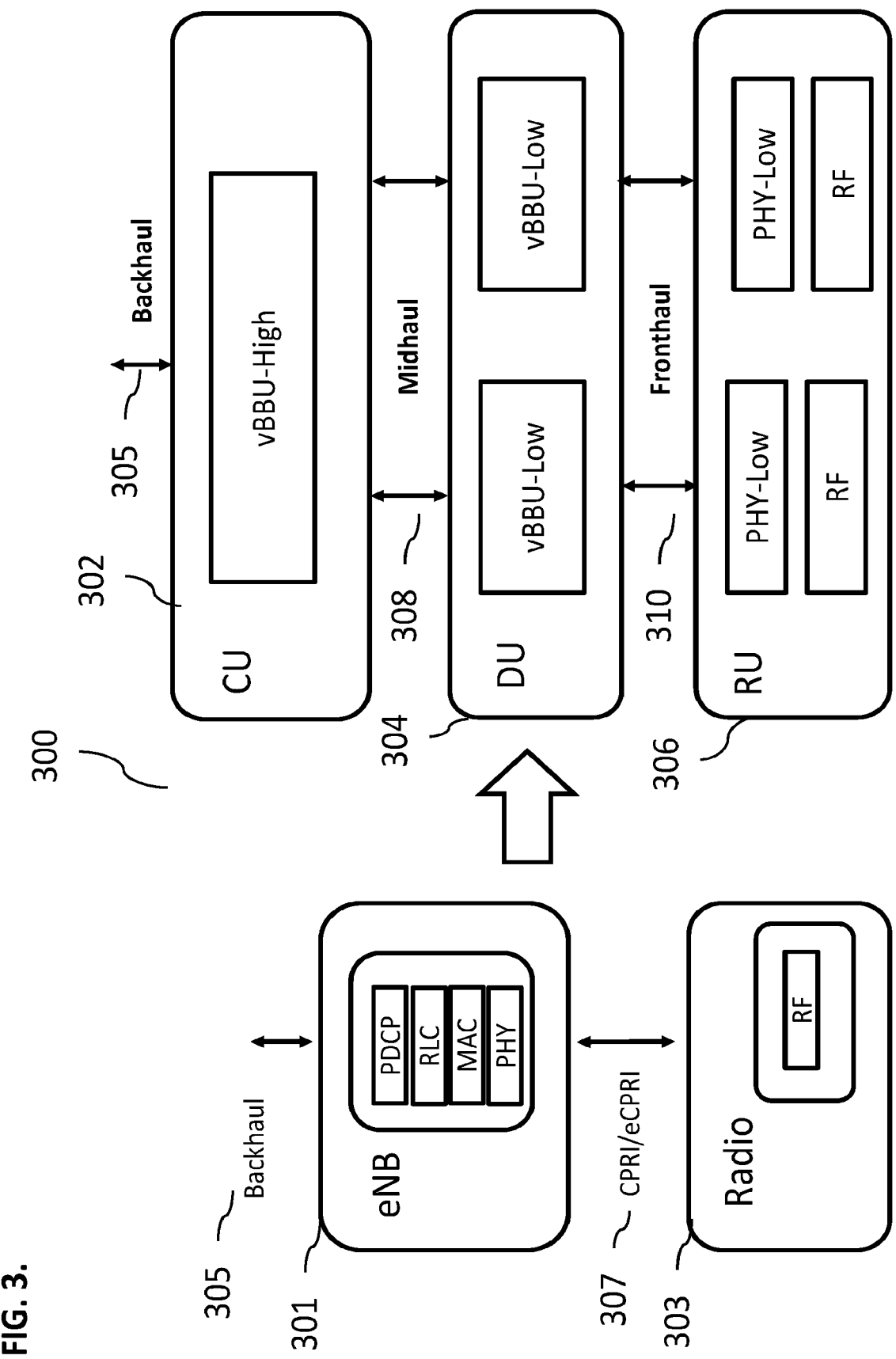
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
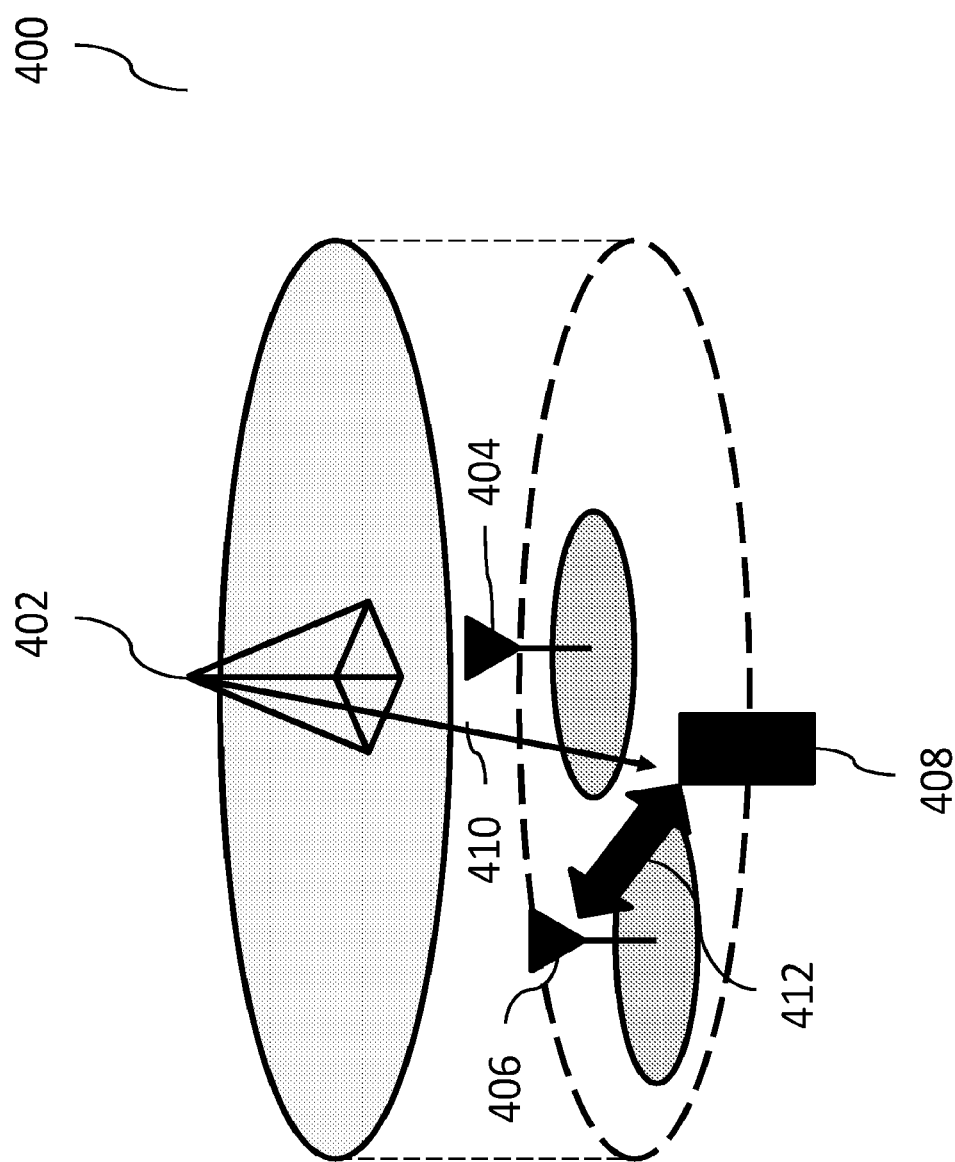
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
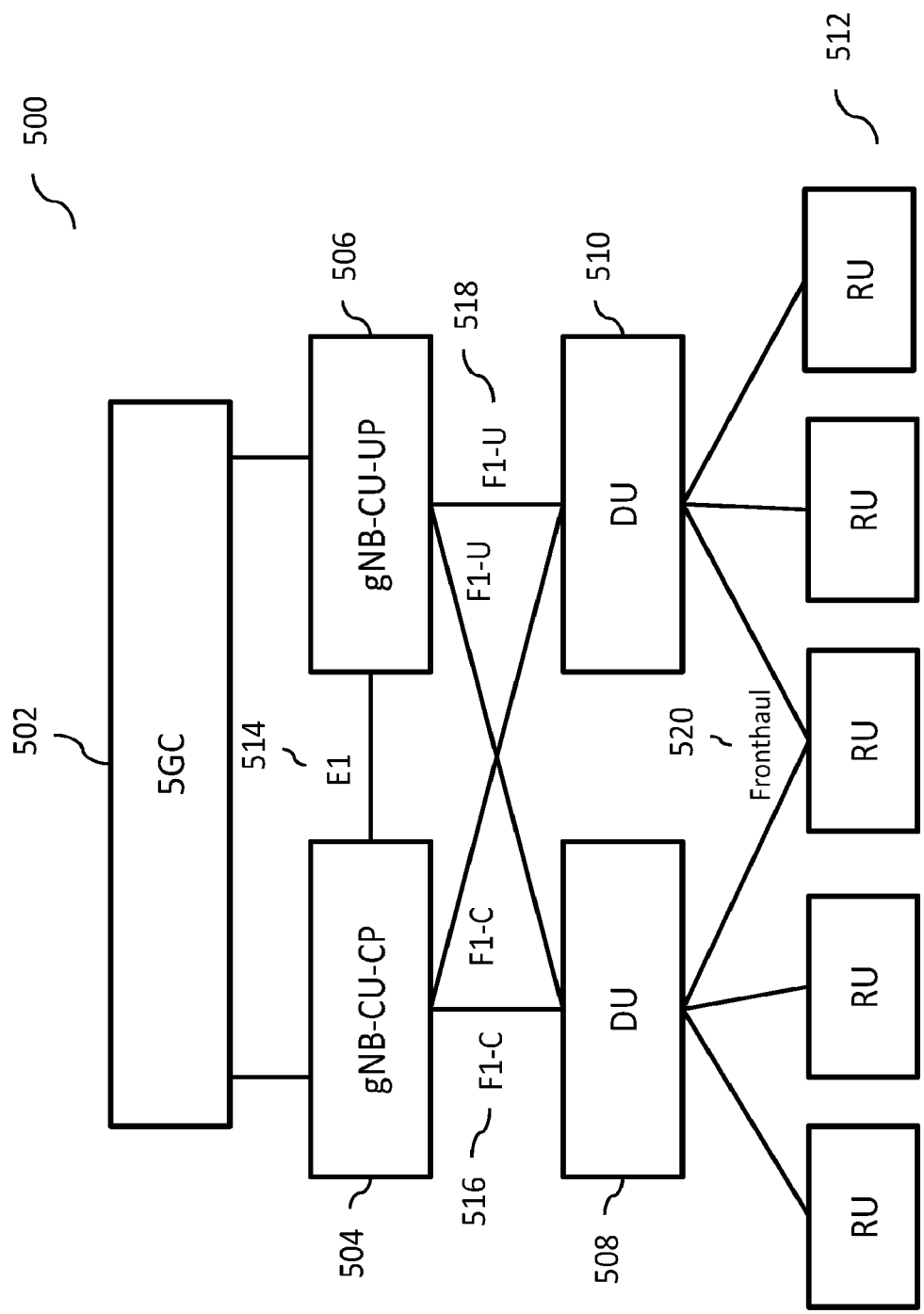
FIG. 5a illustrates an exemplary 5G wireless communication system.

FIG. 5*a* illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5*a*). The remote radio units 512 can be configured to execute a lower part of the PHY layer protocols as well as provide antenna capabilities to the remote units for communication with user equipments (similar to the discussion above in connection with FIGS. 1*a*-2).

Figure 5B:
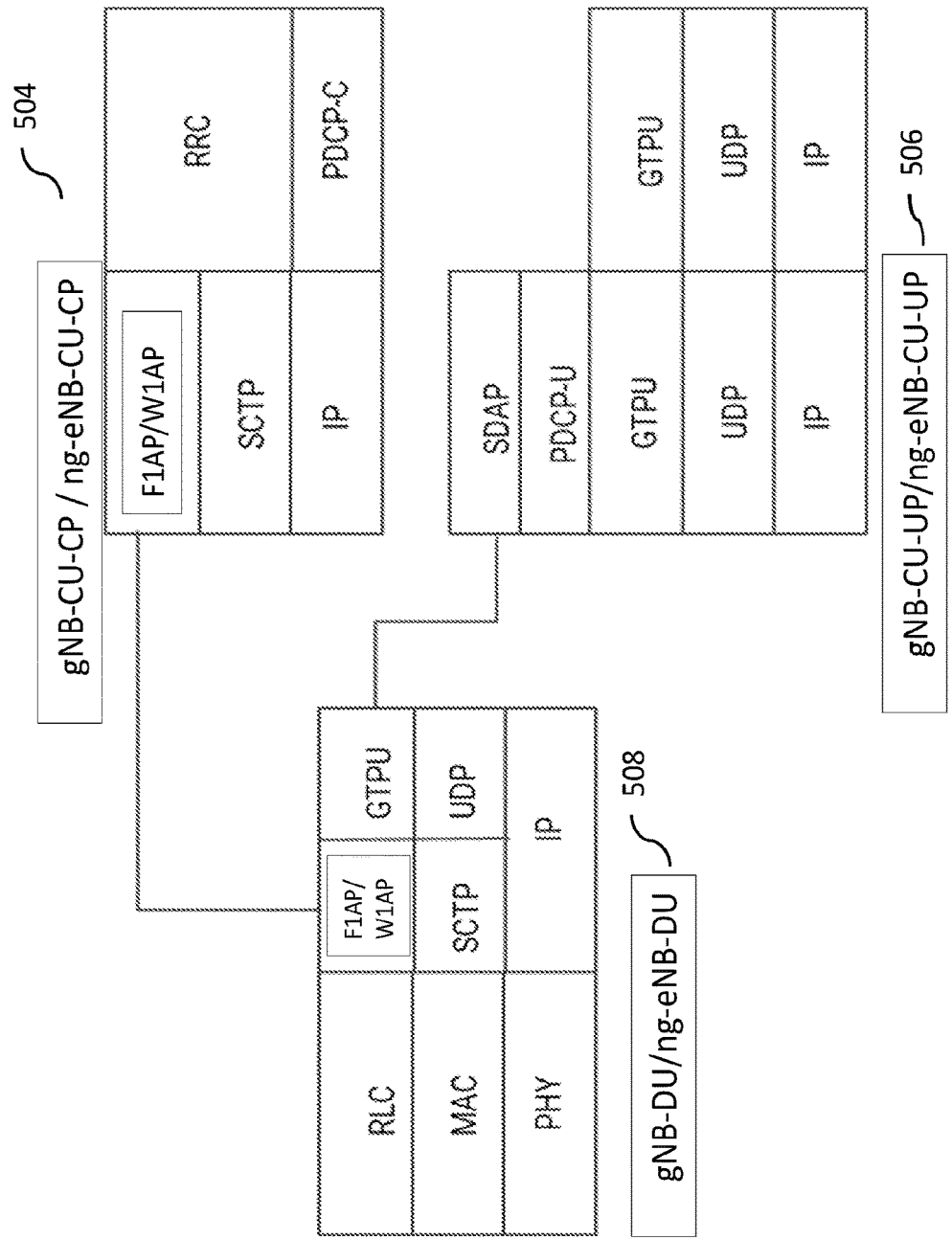
FIG. 5b illustrates an exemplary layer architecture of the split gNB and/or a split ng-eNB (e.g., next generation eNB that may be connected to 5GC)

FIG. 5*b* illustrates an exemplary layer architecture 530 of the split gNB. The architecture 530 can be implemented in the communications system 500 shown in FIG. 5*a*, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5*b*, the gNB-DU 508 can be communicatively coupled to the gNB-CU-CP control plane portion 504 (also shown in FIG. 5*a*) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
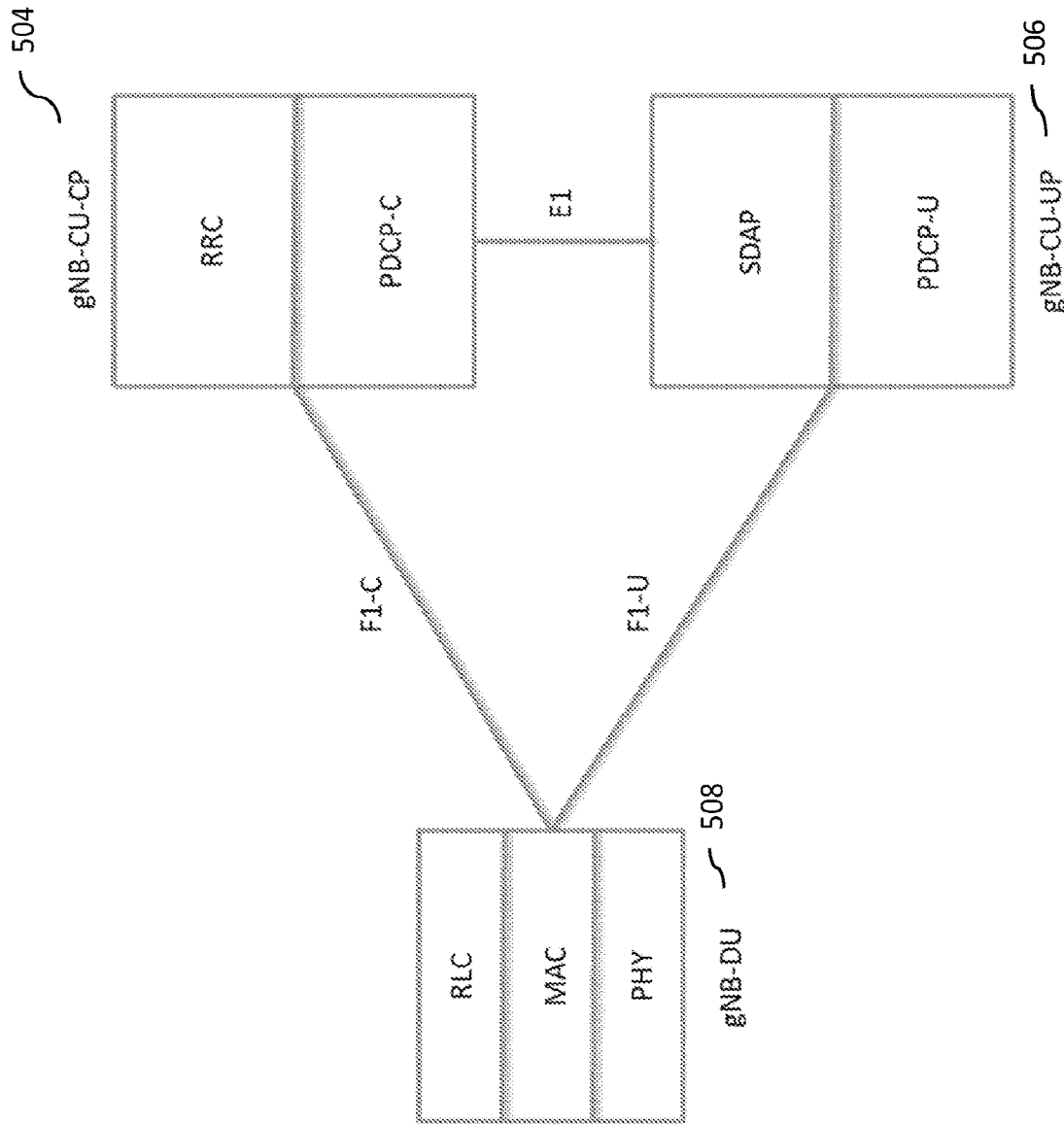
FIG. 5c illustrates an exemplary functional split in the gNB and/or a split ng-eNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PITY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Scaling of Subscriber Capacity in Cloud Native Radio Access Networks

In some implementations, to address various deficiencies of conventional systems, the current subject matter can be configured to perform scaling of subscriber capacity in a cloud native radio access network (RAN), and in particular, to scaling in (or decreasing) and/or scaling out (or increasing) subscriber handling capacity in the cloud RAN.

In conventional radio access networks (RAN), elastically scaling in or scaling out the subscriber and/or throughput capacity(ies) as the user equipment (or, as used interchangeably herein, "mobile subscriber", "subscriber", "mobile user", "user") demand increases or decreases is not present. The conventional RAN solutions are typically dimensioned for peak capacity demands and when the capacity falls below such peak, the compute resources of the RAN can become severely under-utilized.

In some implementations, the current subject matter's cloud native RAN may allow use of cloud-based technologies to dynamically scale in and/or scale out of the processing capacity of various cloud-based processing components (e.g., containers, pods, etc.) that may be required as the subscriber demand increases and/or decreases. The current subject matter may also be configured to execute a process that may determine when to trigger the scaling in and/or scaling out operation.

Next generation RAN (NG-RAN) is defined by the Third Generation Partnership Project ("3GPP") standards body as a radio access network capable of connecting to the 5G core communications network. NG-RAN includes the following radio access networks: NR and EUTRAN. Further, 3GPP defines a new state— "RRC-INACTIVE"— for user equipments connected to the NG-RAN. In the existing systems, it is difficult to determine when to trigger scaling out/in of user equipments that include/have the RRC-inactive state. This is because one or more contexts associated with a user equipment in the RRC-inactive state remain dormant in the RAN without any signaling for a period of time, however, its context may need to be retained nevertheless. Moreover, absence of signaling for/from this user equipment cannot be considered as a trigger for scaling and release of cloud resources (e.g., compute resources, memory resources, etc.). In some implementations, the current subject matter resolves these issues by providing a mechanism for determining when to trigger scaling of subscriber handling capacity whether or not a particular user equipment is associated with an RRC-inactive state.

In some implementations, the current subject matter's cloud native RAN may be configured to include one or more base stations (e.g., gNodeB or gNB, eNodeB or eNB, ng-eNodeB or ng-eNB) and/or portions thereof that may be configured to support operations of one or more subscriber handling pods (or subscriber manager (SM) pods) that may provide wireless communication capabilities to one or more user equipments. The pods may be part of a clustered cloud computing environment, such as, for example, a Kubernetes cluster (e.g., as available from Cloud Native Computing Foundation).

Kubernetes is an open-source container orchestration system for automating software deployment, scaling, and management. It defines a set of building blocks (or "primitives") that provide deployment, maintenance, and scaling mechanisms on CPU, memory, and/or various other metrics. The Kubernetes environment is extensible to meet different workloads, where its internal components, extensions and containers rely on various Kubernetes application programming interfaces (APIs). Kubernetes controls compute and storage resources by defining resources as objects that can be managed. In Kubernetes, a pod can be defined as a basic scheduling unit and includes one or more containers that are guaranteed to be co-located on the same node. Each pod is assigned a unique IP address within the cluster and allows applications to use ports without risking conflict. Moreover, a pod defines a volume, e.g., a local disk directory or a network disk, and exposes it to the containers in the pod. In the current subject matter's cloud native RAN, such pods may be horizontally scaled when user equipment capacity changes (e.g., increases, decreases, etc.).

Figure 6:
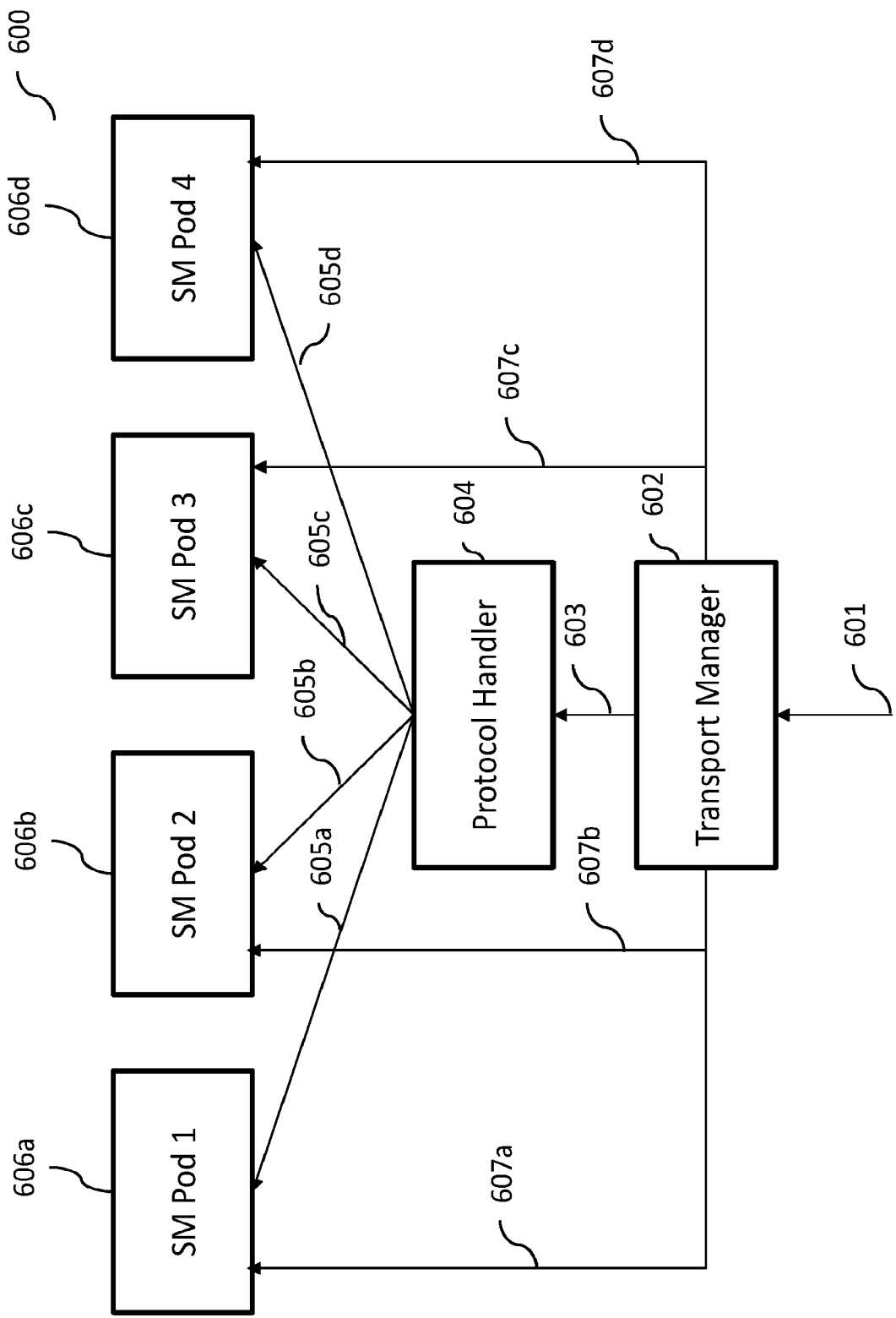
FIG. 6 illustrates an exemplary architecture for routing messages associated with transmission of data to and/or from one or more user equipments in a control plane of a centralized unit (CU-CP)

FIG. 6 illustrates an exemplary architecture 600 for routing messages associated with transmission of data to and/or from one or more user equipments in a control plane of a centralized unit (CU-CP). The architecture 600 may include a transport manager component 602, a protocol handler component 604, and one or more subscriber manager pods (SM Pods) 606 (a, b, c, d). Each SM pod 606 may be associated with a predetermined user equipment handling capacity, e.g., a predetermined number (e.g., but not limited to, 1250, as any other values are possible/configurable) of user equipments that it can process, such as, during and/or at a particular period of time. The number of user equipments may be adjustable and may be predetermined based on specific setting of the communication system, processing capabilities, and/or any other factors.

Figure 7:
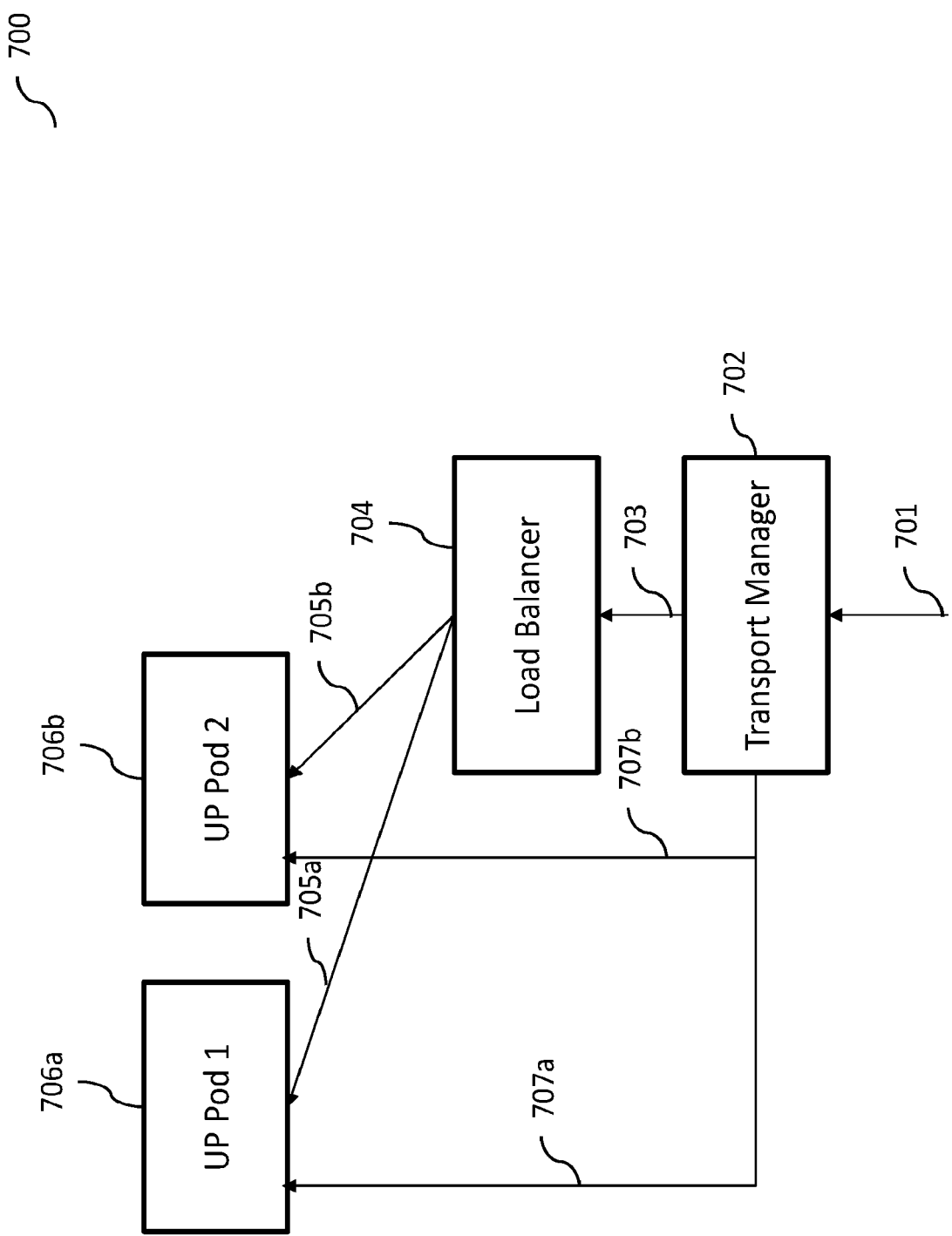
FIG. 7 illustrates an exemplary architecture for routing messages associated with transmission of data to and/or from one or more user equipments in a user plane of a centralized unit (CU-UP)

Using the architecture 600, one or more incoming subscriber related messages, e.g., F1/W1/NGC/S1/Xn/X2 messages, 601 (and/or any other subscriber context and/or identifiers) may be processed and multiplexed to for transmission to the one or more subscriber manager pod 606. The messages may be transmitted via, for instance, 3GPP defined F1/Xn/NGC/S1/X2 interfaces. In particular, the messages 601 may be processed by the transport manager 602 (e.g., F1/W1/NGC/S1/Xn/X2 transport manager, which may include a SCTP termination) and provided, at 603, to the protocol handler 604. The protocol handler 604 may be configured to coordinate with a load balancer (e.g., as shown in FIG. 7) to determine an appropriate SM pod 606 for routing the received message to. The processed messages 603 may include but are not limited to RRC message transfers, handover requests, etc. or, messages that do not include an incoming application protocol (AP) specific user equipment gNB/eNB identifier). If incoming messages include application protocol specific user equipment gNB/eNB identifier, then such message may be routed, at 607, to the particular SM pod 606 (e.g., message 607a may be routed to SM pod 606a, message 607b to SM pod 606b, etc.).

Based on the message 603 received from the transport manager 602, the protocol handler 604 may then be configured to determine a specific SM pod 606 to route the messages, at 605 (e.g., message 605a may be routed to SM pod 606a, message 605b to SM pod 606b, etc.). The handler 604 may be configured to select an SM pod 606 that may be least loaded (e.g., has fewest user equipments assigned to it and/or being processed). When a particular user equipment identifier is transmitted to the SM pods 606, the identifier may be configured to incorporate (e.g., using few bits) an identifier of the SM pod 606 to which user equipment identifier is being transmitted to for processing of the associated user equipment.

FIG. 7 illustrates an exemplary architecture 700 for routing messages associated with transmission of data to and/or from one or more user equipments in a user plane of a centralized unit (CU-UP). The architecture 700 may include a transport manager component 702, a load balancer component 704, and one or more user plane pods (UP Pods) 706 (a, b). Each UP pod 706 may be associated with a predetermined processing capacity (e.g., but not limited to, 3 Gbps, as any other values are possible/configurable). The processing capacity may be adjustable and may be predetermined based on specific setting of the communication system, processing capabilities, and/or any other factors.

Using the architecture 700, one or more incoming subscriber related messages, e.g., E1 messages, 701 may be processed and multiplexed to for transmission to the one or more subscriber manager pod 706. The messages 701 may be processed by the transport manager 702 (e.g., E1 transport manager, which may include a SCTP termination) and, assuming the message 701 includes E1 bearer context setup request, provided, at 703, to the load balancer 704 to determine an appropriate UP pod 706 for routing the received message to. If incoming messages include application protocol specific user equipment identifier, then such message may be routed, at 707, to the particular UP pod 706 (e.g., message 707a may be routed to UP pod 706a, message 707b to UP pod 706b).

Based on the message 703 received from the transport manager 702, the load balancer 704 may then be configured to determine a specific UP pod 706 to route the messages (e.g., bearer context of a particular user equipment), at 705 (e.g., message 705a may be routed to UP pod 706a, message 705b to UP pod 706b). The load balancer 704 may be configured to select an UP pod 706 that may be least loaded in terms of throughout. When a particular user equipment identifier is transmitted to the UP pods 706, a particular user equipment identifier may be allocated at the UP pod 706 (which receives the user equipment identifier), where the identifier may be configured to incorporate (e.g., using few bits) an identifier of that UP pod 706.

In some implementations, the current subject matter may be configured to determine when to trigger scaling in and/or scaling out of capacity of a particular (e.g., subscriber capacity in the SM pod 606 in the control plane(s) of centralized unit(s) and/or throughput capacity in the UP pod 706 in the user plane(s) of centralized unit(s)). The current subject matter may be configured to analyze various factors associated with a particular user equipment, such as, for example, whether or not a particular user equipment is associated or is not associated and/or includes/does not include a RRC-inactive state. Further, when the scaling out/in processing is triggered, the current subject matter may be configured to transmit appropriate messages/signals to one or more peer network functions (e.g., eNB/gNB-DU and/or the EPC and/or 5GC core network).

The RRC-inactive state may be characterized by one or more of the following parameters (as defined in the 3GPP standard specifications) that do not change once the user equipment enters this state: In CU-UP: F1 UL GTPU TEID, N3 DL GTPU TEID, gNB-CU-UP UE E1AP ID, gNB-CU-CP UE E1AP ID; and in CU-CP: gNB-CU-CP UE E1AP ID, gNB-CU-UP UE E1AP ID, RAN UE NGAP ID, F1 UL GTPU TEID, I-RNTI. Thus, suspension of a particular user equipment context (e.g., its current state, security related information, user of a particular network slice, etc.), while saving compute resources, would not remove that user equipment's association to its corresponding subscriber manager pod (in CU-CP) and user plane pod (in CU-UP) (as shown in FIGS. 6 and 7, respectively).

In some implementations, to address the above, the current subject matter may be configured to determine when to (and, subsequently execute) one or more SM pods to handle additional user equipments in CU-CP, as the number of connected mode user equipments changes. It may allocate new user equipments connecting to the gNB/eNB to one or more new SM pods, which may remove a need to move existing user equipments that may currently be anchored/assigned to a particular SM pod to a new SM pod. Further, the current subject matter may be configured to scale in (decrease) SM pods as the number of connected mode user equipments decreases. If a particular SM pod is not completely emptied of user equipments, then any remaining user equipments may be either released and/or transitioned to other SM pods. When a SM pod is scaled in, any RRC-inactive contexts that were earlier associated with that SM pod may either be released and/or transitioned to other SM pods.

Moreover, the current subject matter may be configured to determine when to scale (and, subsequently execute) one or more UP pods to handle additional user equipments in CU-UP, as the number of connected mode user equipments changes. As the throughput handled per UP pod approaches its predetermined threshold (e.g., 2 Gbps on a downlink connection and 1 Gbps on an uplink connection), the current subject matter may be configured to scale out another UP pod. Moreover, new bearer creations may be allocated in the new UP pod and there may be no need to redistribute existing bearers on existing UP pod to the new UP pod. As the number of bearers on a UP pod approaches zero, the UP pod may be scaled in.

In some implementations, the current subject matter may be configured to analyze one or more of the following factors in either the control plane and/or user plane of a centralized unit for the purposes of executing of automatic scaling of pods (e.g., SM pod(s), UP pod(s)). In the control and/or user plane, one or more configurable thresholds (as discussed below) may be defined to determine when scaling out/in may need to be performed. The current subject matter may define specific requirements for user equipment transitions between SM pods and/or for bearer transitions between UP pods during scaling in of capacity. In the control plane, the current subject matter may be configured to transition (to a new SM pod) and/or release any RRC inactive contexts when a particular SM pod associated with that context is scaled in. Similarly, in the user plane, the current subject matter may be configured to handle any RRC inactive bearer contexts when the UP pod associated with that context is scaled.

Figure 8:
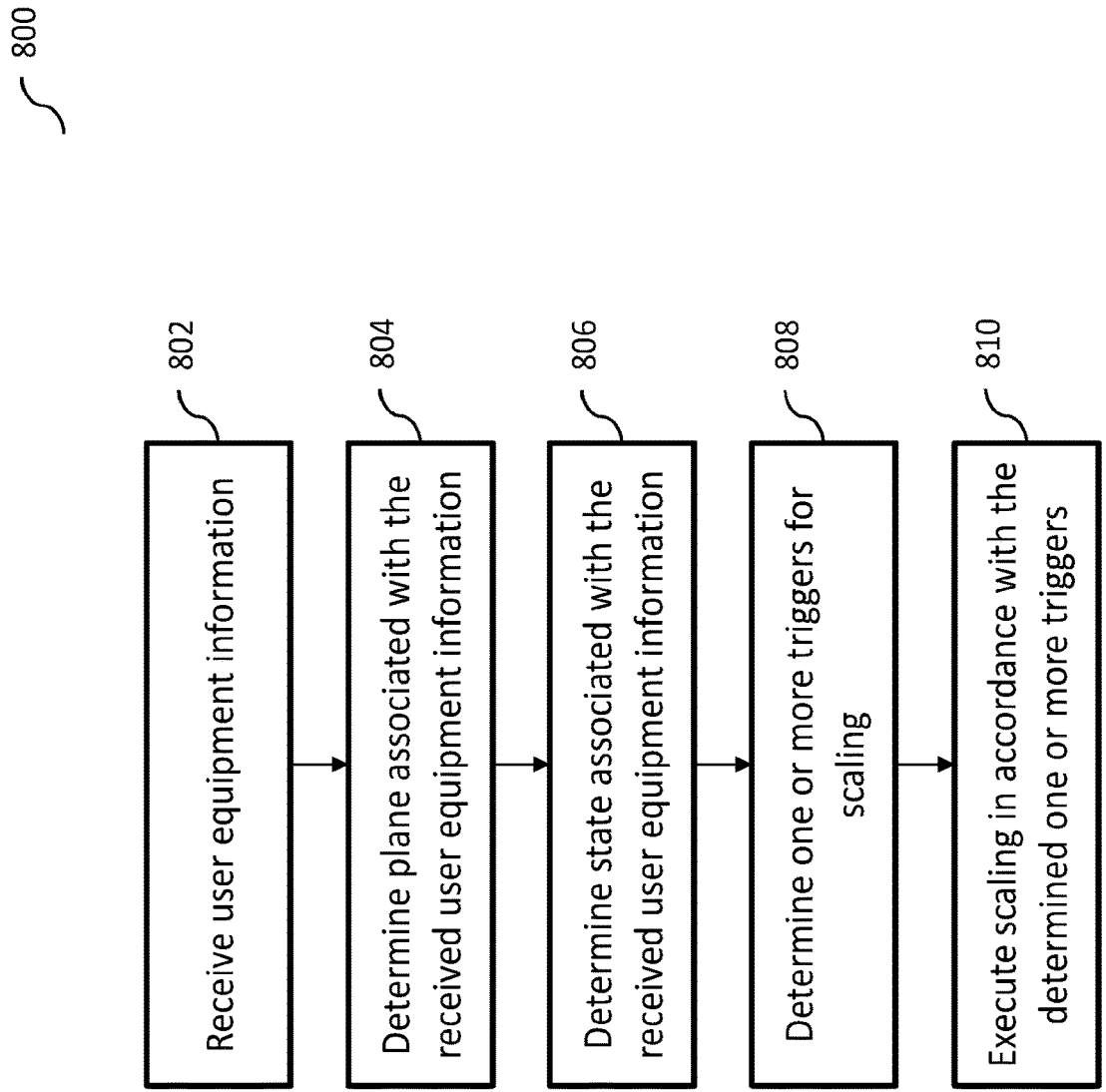
FIG. 8 illustrates an exemplary process for determining one or more capacity scaling triggers and/or executing scaling of capacity in one or more pods, according to some implementations of the current subject matter.

FIG. 8 illustrates an exemplary process 800 for determining one or more capacity scaling triggers and/or executing scaling of capacity in one or more pods (e.g., SM pods 606 and/or UP pods 706), according to some implementations of the current subject matter. The process 800 may be performed in one or more components of a base station (e.g., eNB, gNB), such as those shown in and discussed above with regard to FIGS. 1a-7. At 802, one or more user equipments information (e.g., a data packet, a message (e.g., F1, W1, NGC, S1, Xn, X2, E1, etc. message), etc.) may be received. For example, the message may be received by a transport controller component 602, 702 of a base station, as shown in FIGS. 6, 7, respectively.

At 804, the information received from the user equipments may be used to determine a plane, e.g., a control plane, a user plane, associated with each user equipment communication. A state of each user equipment may also be determined, at 806. For example, it may be determined that a particular user equipment is in an RRC-inactive state. Alternatively, or in addition to, it may be determined that there are no user equipments that are in the RRC-inactive state. The process 800 may then proceed to determine one or more triggers for when to execute scaling of capacity in one or more pods based on the determinations, at 804-806.

In particular, at 808, the current subject matter may be configured to determine one or more triggers for executing scaling out/in of capacity for a base station's (e.g., eNB/gNB) CU-CP when no user equipments are in RRC-inactive state. For this determination, the current subject matter may be configured to define one or more of the following configurable thresholds in the CU-CP: weight(s) assigned to one or more RRC connected user equipments, $W_R$ (having a value between 0 to 1), weight(s) assigned to a number of calls-per-second processing, $W_C$ (having a value of 0 to 1), threshold value(s) for executing capacity scaling out, $Th_o$, and threshold value(s) for executing capacity scaling in, $Th_i$. Assuming the current number of RRC connected user equipments is $R_n$, and an average number of calls-per-second processing is C, then the current subject matter, at 808, may define a scaling out trigger using the following:

$$\Sigma(W_R * R_n + W_C * C) > Th_o \quad (1)$$

where the summation is over weighted RRC connected users and number of calls-per-second across all available instances of SM pods 606.

The current subject matter may, at 808, define a scaling in trigger using the following:

$$\Sigma(W_R * R_n + W_C * C) < Th_i \quad (2)$$

where the summation is over weighted RRC connected users and number of calls-per-second across all available instances of SM pods 606.

Alternatively, or in addition to, the current subject matter, at 808, may be configured to determine one or more triggers for executing scaling out/in of capacity for a base station's (e.g., eNB/gNB) CU-CP when one or more user equipments are in RRC-inactive state. For this determination, the current subject matter may be configured to define one or more of the following configurable thresholds in the CU-CP: weight(s) assigned to one or more RRC connected user equipments, $W_R$ (having a value between 0 to 1), weight(s) assigned to one or more RRC inactive user equipments, $W_I$ (having a value between 0 to 1), weight(s) assigned to a number of calls-per-second processing, $W_C$ (having a value of 0 to 1), threshold value(s) for executing capacity scaling out, $Th_o$, and threshold value(s) for executing capacity scaling in, $Th_i$. Assuming the current number of RRC connected user equipments is $R_n$, the current number of RRC inactive user equipments is $R_I$, and an average number of calls-per-second processing is C, then the current subject matter, at 808, may define a scaling out trigger using the following:

$$\Sigma(W_R * R_n + W_I * R_I + W_C * C) > Th_o \quad (3)$$

where the summation is over weighted RRC connected users, RRC inactive users and number of calls-per-second across all available instances of SM pods 606.

Likewise, the current subject matter, at 808, may define a trigger for executing of scaling in of the capacity of SM pods 606 using the following:

$$\Sigma(W_R * R_n + W_I * R_I + W_E * C) < Th_i \quad (4)$$

where the summation is over weighted RRC connected users, RRC inactive users and calls per second across all the available instances of subscriber manager pods.

Moreover, at 808, the current subject matter may be configured to determine one or more triggers for executing scaling out/in of capacity for a base station's (e.g., eNB/gNB) CU-UP when no user equipments are in RRC-inactive state. For this determination, the current subject matter may be configured to define one or more of the following configurable thresholds in the CU-UP: weight(s) assigned to one or more RRC connected user equipments, $W_R$ (having a value between 0 to 1), threshold value(s) for executing capacity scaling out, $Th_o$, and threshold value(s) for executing capacity scaling in, $Th_i$. Assuming the current throughput in CU-UP is $TP_R$, then the current subject matter, at 808, may define a scaling out trigger using the following:

$$\Sigma(W_R*TP_R) > Th_o \qquad (5)$$

where the summation is over weighted throughput across all available instances of UP pods 706.

Further, the current subject matter, at 808, may also define a scaling in trigger using the following:

$$\Sigma(W_R*TP_R) < Th_i \qquad (6)$$

where the summation is over weighted throughput across all available instances of UP pods 706.

Similar to the CU-CP processing, the current subject matter, at 808, may be configured to determine one or more triggers for executing scaling out/in of capacity for a base station's (e.g., eNB/gNB) CU-UP when one or more user equipments are in RRC-inactive state. In this case, the current subject matter may be configured to define one or more of the following configurable thresholds in the CU-UP: weight(s) assigned to one or more RRC connected user equipments, $W_R$ (having a value between 0 to 1), weight(s) assigned to one or more RRC inactive user equipments, $W_I$ (having a value between 0 to 1), threshold value(s) for executing capacity scaling out, $Th_o$, and threshold value(s) for executing capacity scaling in, $Th_i$. Assuming the current throughput observed in CU-UP is $TR_R$, and an expected throughput for the suspended bearers (e.g., for user equipments in the RRC-inactive state) is $TP_I$. This value may be determining by summing up session aggregate maximum bit rate (AMBR) values of all the packet data unit (PDU) sessions that are suspended. Using the above values, the current subject matter, at 808 may define a scale out trigger using the following:

$$\Sigma(w_R*TP_R \pm W_I*TP_I) > Th_o \qquad (7)$$

where the summation is over weighted throughput of RRC connected users and weighted expected throughput of RRC inactive users across all available instances of UP pods 706.

A scale in trigger may be defined using the following:

$$\Sigma(W_R*TP_R \pm W_I*TP_I) < Th_i \qquad (8)$$

where the summation is over weighted throughput of RRC connected users and weighted expected throughput of RRC inactive users across all available instances of UP pods 706.

Referring back to FIG. 8, at 810, scaling may be executed in accordance with the one or more triggers, as defined at 808. In this case, execution of scaling may be dependent on a particular plane (e.g., control plane, user plane) as well as pods (SM pods 606, UP pods 706, as shown in FIGS. 6, 7, respectively).

Figure 9A:
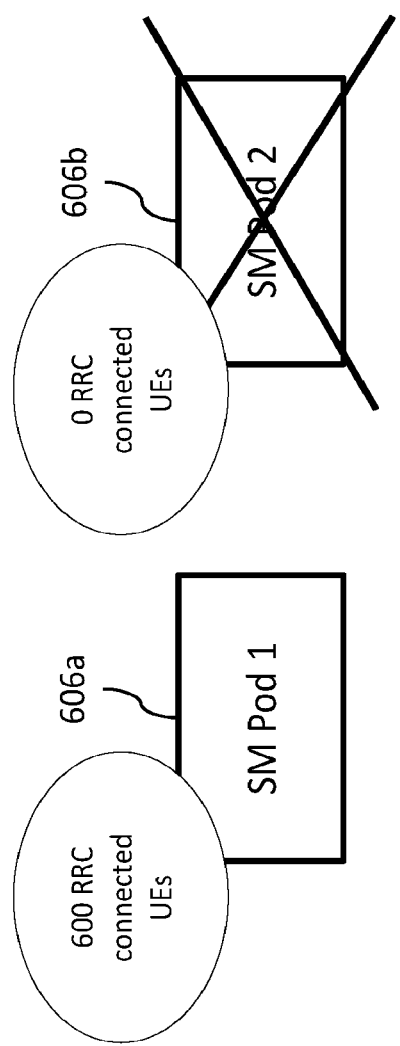
FIGS. 9a-c illustrate exemplary processes for execution of scaling in one or more SM pods shown in FIG. 6, according to some implementations of the current subject matter.
Figure 9B:
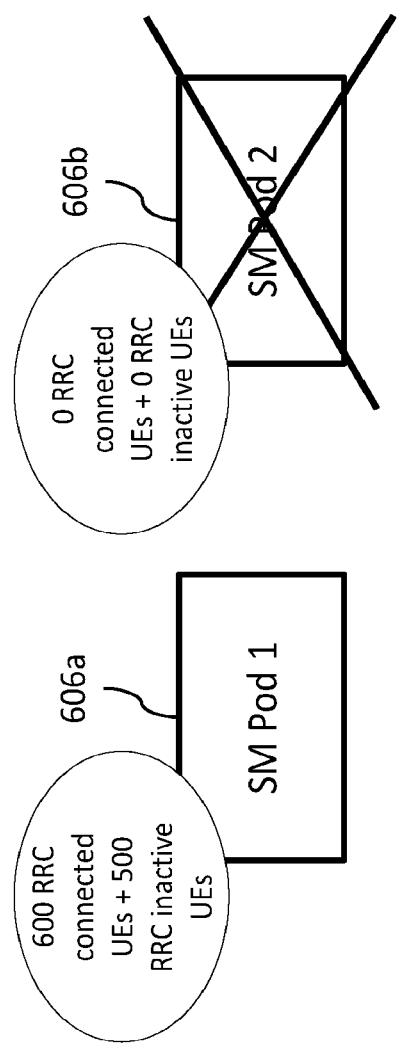
Figure 9C:
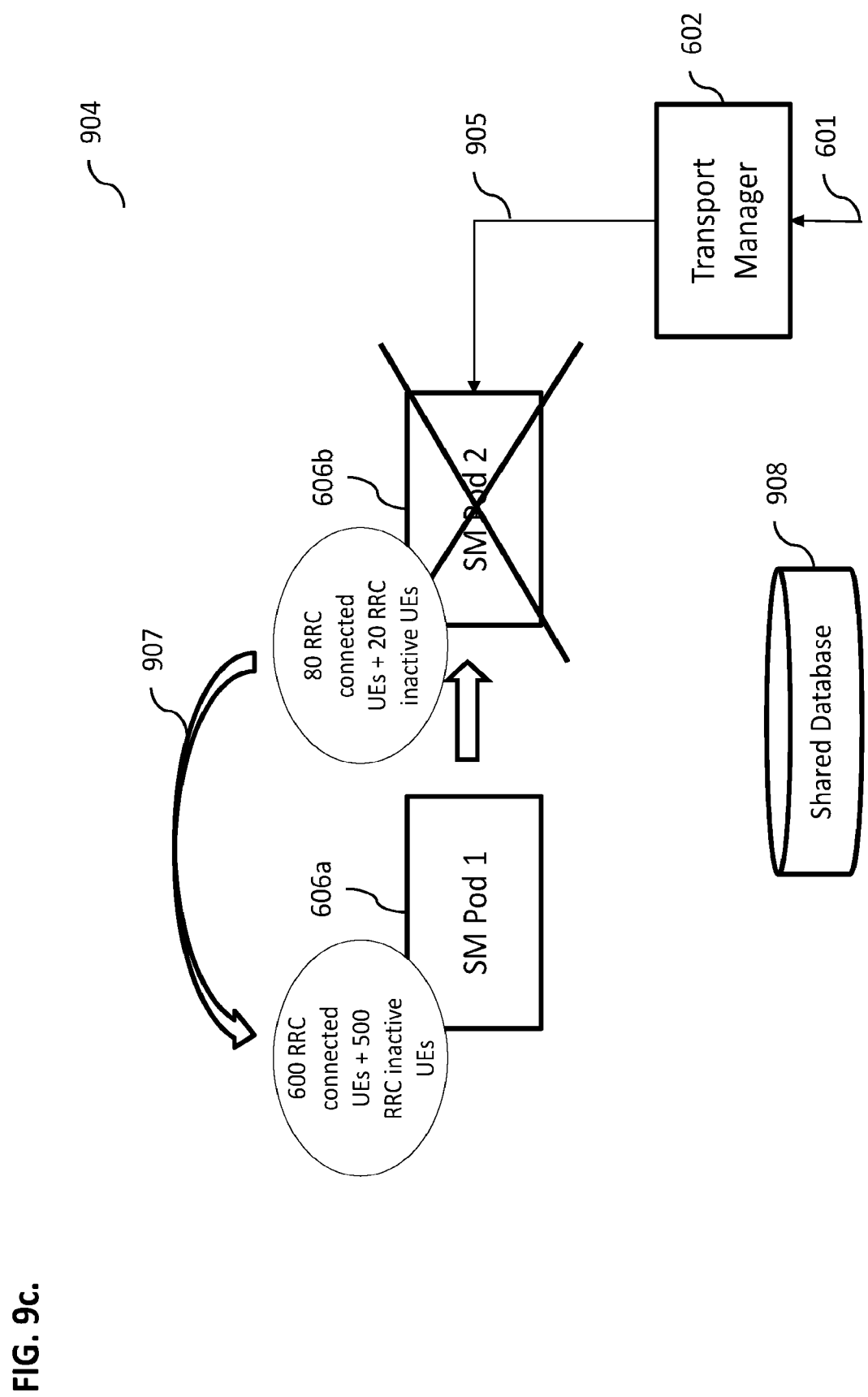

Thus, if, based one or more triggers defined above being met, it is determined that one or more SM pods 606 associated with CU-CP of a base station (e.g., gNB, eNB) may need to be scaled in, the current subject matter may be configured to execute one or more of the following processes, as shown in FIGS. 9a-c.

In some implementations, the current subject matter may be configured to wait for all the RRC connected user equipment contexts handled by a particular SM pod 606 to be released on their own (e.g., such as when user equipments enter an idle state) and then release capacity of that SM pod 606, where releasing of capacity may involve making various resources (e.g., compute, memory, etc.) resource available for consumption/use. FIG. 9a illustrates an exemplary process 900 for execution of scaling in one or more SM pods 606, according to some implementations of the current subject matter. As shown in FIG. 9a, the SM pod 606a may have, by way of a non-limiting example, 600 RRC connected user equipments and the SM pod 606b may have, by way of a non-limiting example, 0 RRC connected user equipments.

Thus, as soon as a defined scaling in trigger for SM pod 606b is met (e.g., as determined in accordance with one or more equations (1)-(4), the SM pod 606b may be marked for scaling in and removed. As a result, no new user equipment contexts (e.g., identifiers, etc.) may be assigned to and/or created on the SM pod 606b. Further, the protocol handler 604 and the load balancer may ensure that no new user equipment context is routed to the SM pod 606b.

Alternatively, or in addition to, in some implementations, the current subject matter may be configured to wait for all the RRC connected user equipment contexts and the RRC-inactive user equipment contexts handled by a particular SM pod 606 to be released on their own (e.g., such as when user equipments enter an idle state) and then release capacity of that SM pod 606. FIG. 9b illustrates an exemplary process 902 for execution of scaling in one or more SM pods 606, according to some implementations of the current subject matter. As shown in FIG. 9b, the SM pod 606a may have, by way of a non-limiting example, 600 RRC connected user equipments and 500 RRC inactive user equipments and the SM pod 606b may have, by way of a non-limiting example, 0 RRC connected user equipments and 0 RRC inactive user equipments.

Hence, as soon as a defined scale in trigger for the SM pod 606b is met (e.g., as again, defined in accordance with one or more equations (1)-(4)), the SM pod 606b may be marked for scaling in and removed. Thus, no new user equipment contexts may be created on the SM pod 606b and the protocol handler 604 and the load balancer may ensure that no new user equipment context is routed to that SM pod.

In yet a further alternative (or in addition to), the current subject matter may be configured to migrate the user equipment contexts from the SM pod 606 that is getting scaled in to other SM pods 606. FIG. 9c illustrates an exemplary process 904 for execution of scaling in one or more SM pods 606, according to some implementations of the current subject matter. As shown in FIG. 9c, the SM pod 606a may have, by way of a non-limiting example, 600 RRC connected user equipments and 500 RRC inactive user equipments and the SM pod 606b may have, by way of a non-limiting example, 80 RRC connected user equipments and 20 RRC inactive user equipments. The user equipments assigned to SM pod 606b may be transitioned, at 907 to SM pod 606a. When the user equipment context is transitioned (and/or migrated) from one SM pod 606 (e.g., SM pod 606a) to another SM pod 606 (e.g., SM pod 606b), one or more of following user equipment identifiers (UE IDs) may be configured to be changed and may be transmitted to one or more peer nodes (e.g., DU, MME, AMF, etc.): gNB-/eNB-CU-CP UE E1AP ID, gNB-/eNB-CU-CP UE F1AP and/or W1AP ID, gNB-/eNB-CU-CP UE NGAP and/or S1AP ID, and/or any combination thereof.

In some implementations, to support such identifier changes, one or more custom message extensions to one or more of the following messages may or may not be implemented:

F1 and W1: UE CONTEXT MODIFICATION REQUEST;

NGAP: PDU SESSION RESOURCE MODIFY INDICATION and/or a new user equipment level NGAP message to signal change of UE ID;

S1AP: UE CONTEXT MODIFY INDICATION;

E1AP: BEARER CONTEXT MODIFICATION REQUEST; and/or

X2AP: SGNB MODIFICATION REQUIRED (this is applicable for 5G deployed in ENDC mode).

When the user equipment context is transitioned to another SM pod 606*a* to SM pod 606*b*, the UE IDs do not change. In this case, the UE ID may be allocated from a shared database 908 and/or any other storage location that may be accessible by the base station. A mapping of the UE ID to SM pod (to which user equipment is transitioned) may be updated in the database 908 with the new SM pod (i.e., SM pod 606*a*) information. Thus, the transport manager 602 will fail (at 905) to deliver to SM pod 606*b* any new messages 601 that are received by it.

Figure 10A:
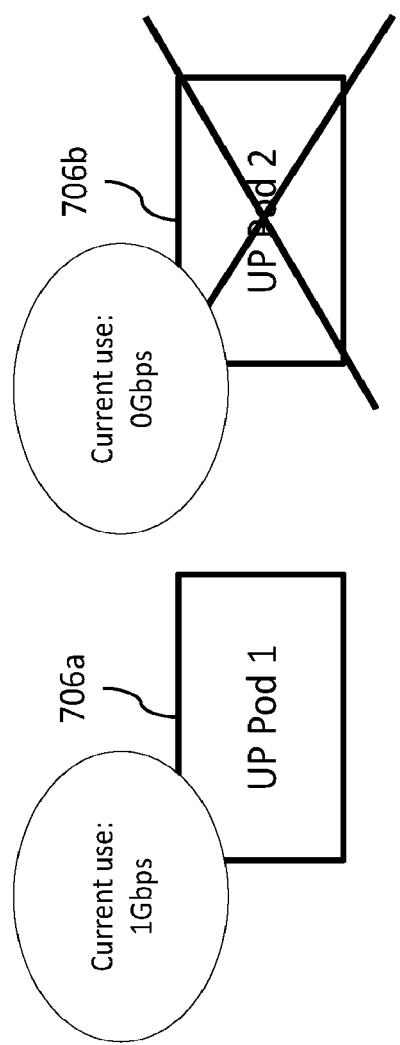
FIGS. 10a-c illustrate exemplary processes for execution of scaling in one or more UP pods shown in FIG. 7, according to some implementations of the current subject matter.
Figure 10B:
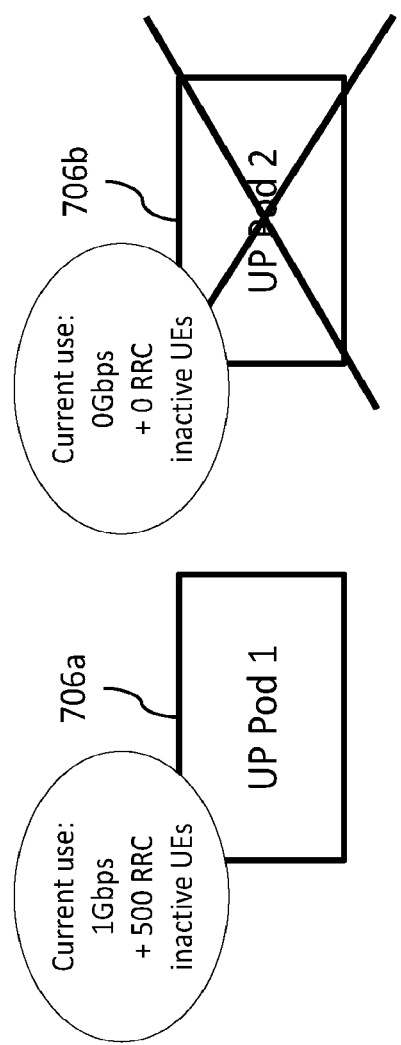
Figure 10C:
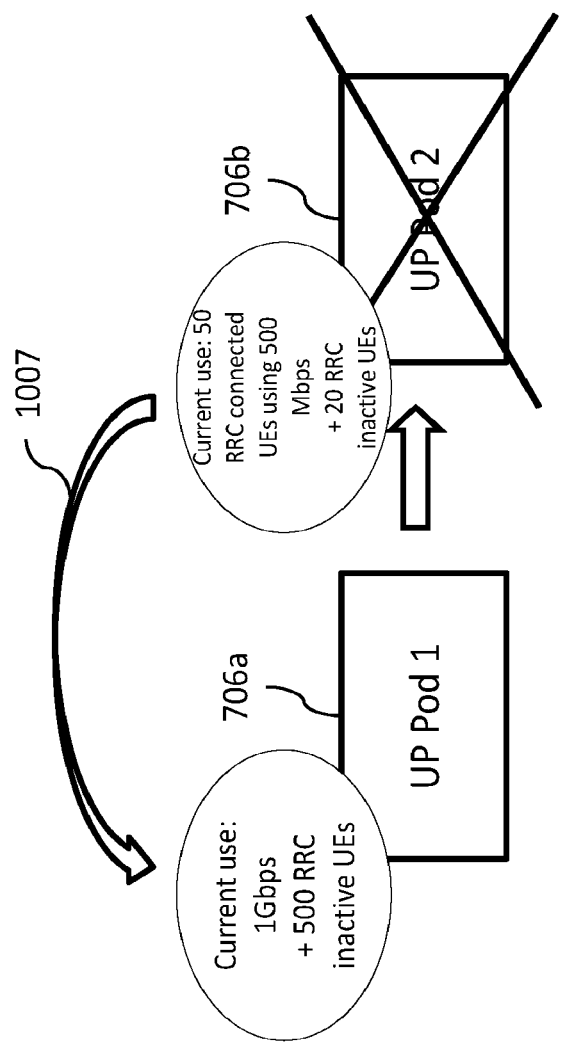

Referring back to FIG. 8, if, based one or more triggers defined at 808, it is determined that one or more UP pods 706 associated with CU-UP of a base station (e.g., gNB, eNB) may need to be scaled in, the current subject matter may be configured to execute one or more of the following processes, as shown in FIGS. 10*a*-*c*.

In some implementations, the current subject matter may be configured to wait for all the RRC connected user equipment bearer contexts handled by a particular UP pod 706 to be released on their own (e.g., such as when user equipments enter an idle state) and then release capacity of that UP pod 706, where releasing of capacity may involve making various resources (e.g., compute, memory, etc.) resource available for consumption/use. FIG. 10*a* illustrates an exemplary process 1000 for execution of scaling in one or more UP pods 706, according to some implementations of the current subject matter. As shown in FIG. 10*a*, the UP pod 706*a* may have, by way of a non-limiting example, a capacity of 1 Gbps for processing throughput associated with user equipments and the UP pod 706*b* may have, by way of a non-limiting example, 0 Gbps capacity.

Thus, as soon as a defined scaling in trigger for UP pod 706*b* is met (e.g., as determined in accordance with one or more equations (5)-(8)), the UP pod 706*b* may be marked for scaling in and removed. As a result, no new user equipment bearer contexts may be assigned to and/or created on the UP pod 706*b* during, for example, an E1 bearer context setup procedure. Further, the protocol handler 604 and the load balancer 704 may ensure that no new user equipment context is routed to the UP pod 706*b*.

Alternatively, or in addition to, in some implementations, the current subject matter may be configured to wait for all the RRC connected user equipment bearer contexts and the RRC-inactive user equipment bearer contexts handled by a particular UP pod 706 to be released on their own (e.g., such as when user equipments enter an idle state) and then release capacity of that UP pod 706. FIG. 10*b* illustrates an exemplary process 1002 for execution of scaling in one or more UP pods 706, according to some implementations of the current subject matter. As shown in FIG. 10*b*, the UP pod 706*a* current use may include, by way of a non-limiting example, 1 Gbps throughput capacity and 500 RRC inactive user equipments and the UP pod 706*b* may have, by way of a non-limiting example, 0 Gbps throughput capacity and 0 RRC inactive user equipments.

Hence, as soon as a defined scale in trigger for the UP pod 706*b* is met (e.g., as again, defined in accordance with one or more equations (5)-(8)), the UP pod 706*b* may be marked for scaling in and removed. Thus, no new user equipment bearer contexts may be assigned to and/or created on the UP pod 706*b* during, for example, an E1 bearer context setup procedure. Further, the protocol handler 604 and the load balancer 704 may ensure that no new user equipment context is routed to the UP pod 706*b*.

In yet a further alternative (or in addition to), the current subject matter may be configured to migrate the user equipment contexts from the UP pod 706 that is getting scaled in to other UP pods 706. FIG. 10*c* illustrates an exemplary process 1004 for execution of scaling in one or more UP pods 706, according to some implementations of the current subject matter. As shown in FIG. 10*c*, the UP pod 706*a* current use may include, by way of a non-limiting example, 1 Gbps throughput capacity and 500 RRC inactive user equipments and the UP pod 706*b* may have, by way of a non-limiting example, 50 RRC connected user equipment bearer contexts using 500 Mbps throughput capacity and 20 RRC inactive user equipments. The user equipments bearer contexts assigned to UP pod 706*b* may be transitioned, at 1007 to UP pod 706*a*. This may result in the F1-U/NG-U (N3) and/or the S1-U endpoint being changed for the bearers that are being transitioned. The F1-U/NG-U (N3)/S1-U endpoint information may include at least one of the following: F1-U/NG-U (N3)/S1-U GTP-U tunnel TNL address (IP address), GTP-U TEID, and any combination thereof.

In some implementations, the CU-UP may signal a change of the endpoint address using E1 BEARER CONTEXT MODIFICATION REQUIRED message. When the endpoint address is changed and signaled to the CU-CP, the CU-CP may be configured to inform the peer nodes via F1/W1/NGC/S1 signaling using one of the following messages:

F1AP/W1AP UE CONTEXT MODIFICATION REQUEST

NGAP: PDU SESSION RESOURCE MODIFY INDICATION

S1AP: UE CONTEXT MODIFY INDICATION

X2AP: SGNB MODIFICATION REQUIRED (applicable for 5G deployed in ENDC mode)

In the E1 BEARER CONTEXT MODIFICATION REQUIRED message (as defined in 3GPP TS 38.463), it may be possible to modify the N3 and S1U side GTP endpoint but not the F1-U side uplink endpoint. Thus, the current subject matter may be configured to generate a custom extension (e.g., a new IE) to this message to allow modification of F1-U UL GTPU endpoint.

Figure 11:
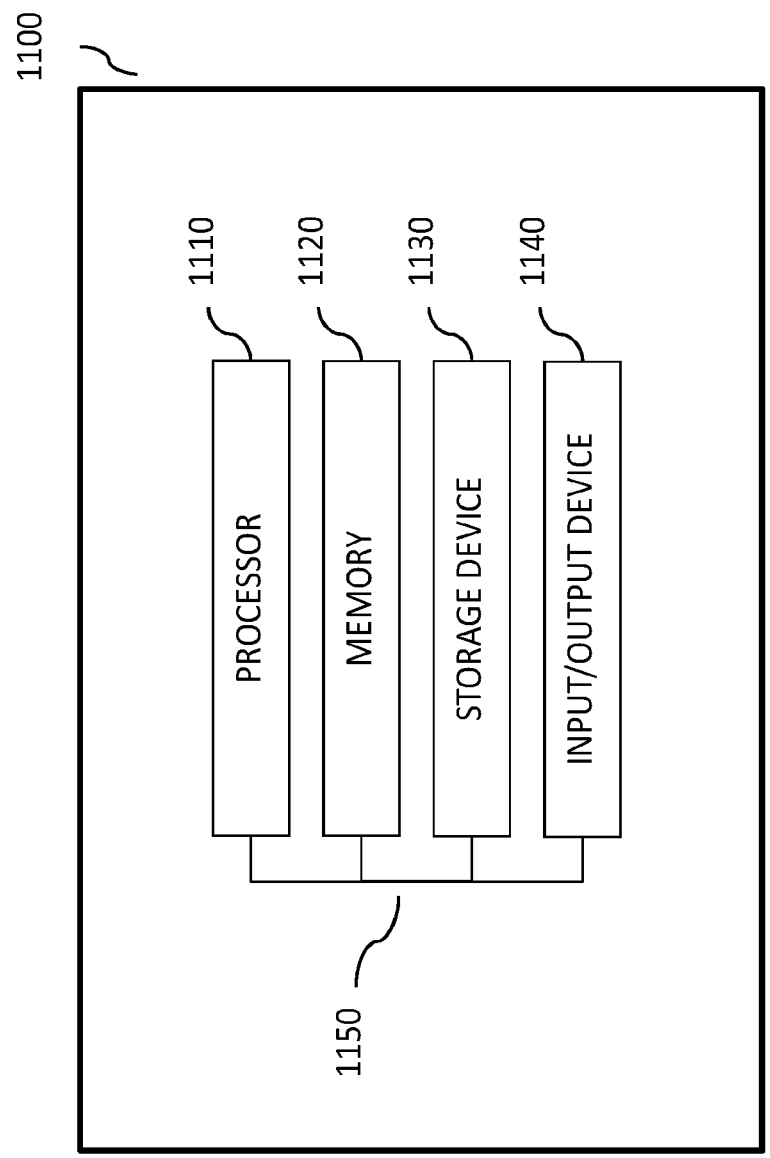
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
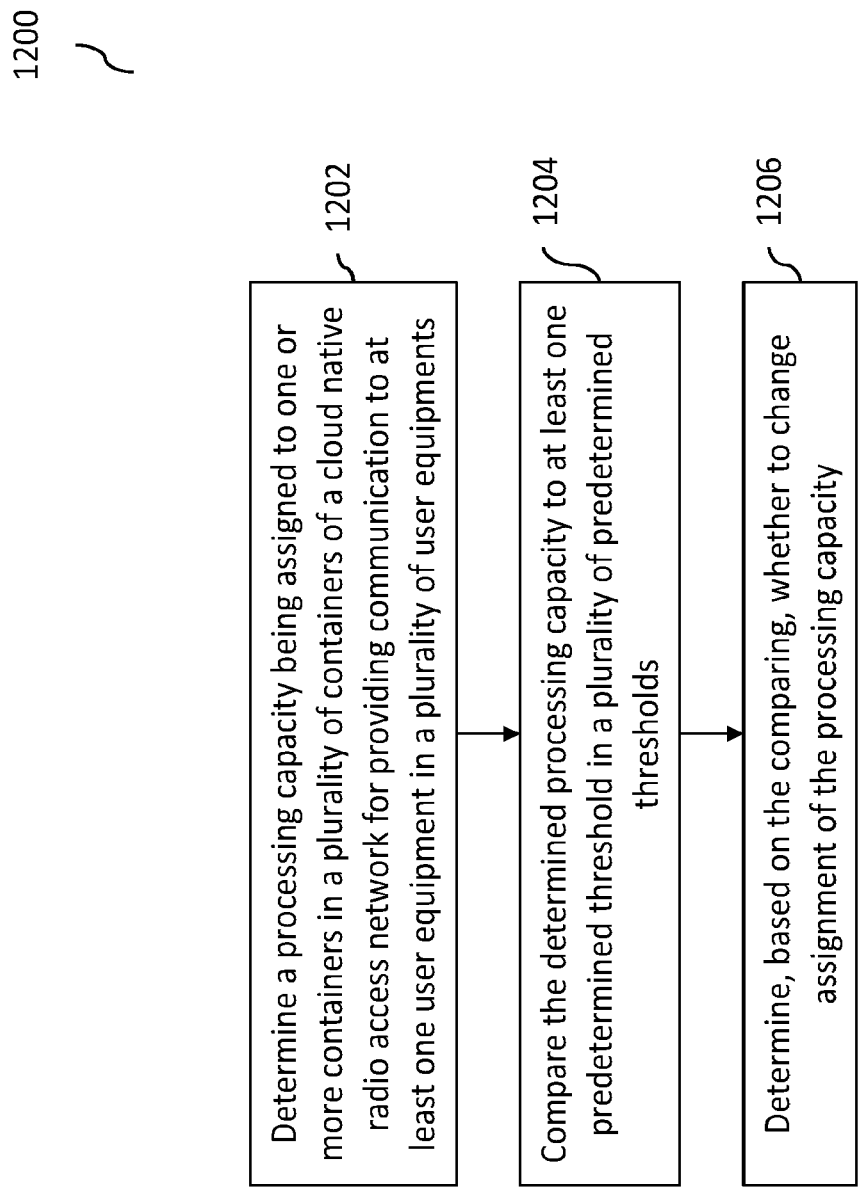
FIG. 12 illustrates an exemplary method, according to some implementations of the current subject matter.

FIG. 12 illustrates an exemplary method 1200 for scaling of subscriber capacity in a cloud native radio access network (RAN), according to some implementations of the current subject matter. The method 1200 may be performed using one or more implementations shown in FIGS. 6-10c. At 1202, a processing capacity being assigned to one or more containers (e.g., SM pod, UP pod, etc.) in a plurality of containers of a cloud native radio access network for providing communication to at least one user equipment in a plurality of user equipments may be determined. The capacity may be determined based on a number of user equipments that a particular container is handling (e.g., in the control plane) and/or a throughput of that container (e.g., in a user plane). At 1204, the determined processing capacity may be compared to at least one predetermined threshold (e.g., as discussed in connection with one or more equations (1)-(8)) in a plurality of predetermined thresholds. At 1206, based on the comparing, a determination may be made whether to change an assignment of the processing capacity (e.g., whether to scale out/in such capacity in either control plane and/or user plane, such as by transitioning one user equipment to another container). The change in assignment of processing capacity may be based one or more of increasing the number of containers and/or decreasing the number of containers processing user equipments.

In some implementations, the current subject matter can include one or more of the following optional features. In some implementations, the method may also include changing the assignment of the processing capacity.

In some implementations, the containers may be associated with at least one of: at least one control plane component and at least user plane component of a centralized unit of a base station. The determination of whether to change the assignment of the processing capacity assigned may include at least one of the following: increasing a number of user equipments being processed by the at least one control plane component by increasing a number of containers providing communication to the user equipments, decreasing a number of user equipments being processed by the at least one control plane component by decreasing the number of containers providing communication to the user equipments, increasing a throughout capacity of the at least one user plane component by increasing the number of containers providing communication to the user equipments, decreasing a throughput capacity of the at least one user plane component by decreasing the number of containers providing communication to the user equipments, and any combinations thereof.

In some implementations, at least one of the determining the processing capacity, the comparing, and the determining whether to change the processing capacity may be performed by at least one base station in a wireless communication system. The base station may include at least one of the following: a base station, an eNodeB base station, a gNodeB base station, a wireless base station, a wireless access point, and any combination thereof. The base station may be a base station operating in at least one of the following communications systems: a long term evolution communications system, a new radio communications system, a wireless communication system, and any combination thereof. The base station may include at least one centralized unit, the centralized unit include at least one of: a control plane component, a user plane component, and any combination thereof.

In some implementations, one or more user equipments in the plurality of user equipments may be associated with a radio resource control (RRC) status. The RRC status may include at least one of the following: an RRC-inactive status, no RRC-inactive status, an RRC connected status, and any combination thereof. One or more predetermined weights may be assigned to one or more user equipments in the plurality of user equipments based on the RRC status. At least one predetermined threshold may be selected from a plurality of predetermined thresholds based on the RRC status of one or more user equipments. The comparing may include comparing the determined processing capacity determined for one or more user equipments being assigned one or more predetermined weights to the predetermined threshold selected based on the RRC status of one or more user equipments.

In some implementations, the method may further include transitioning, based on the determining whether to change the assignment of the processing capacity, at least one user equipment assigned to at least one container to at least another container in the plurality of containers, and providing, using at least another container, communication to the transitioned user equipment. The method may also include preventing, subsequent to the transitioning, at least one container from providing communication to at least another user equipment in the plurality of user equipments. The method may also include changing at least one identifier of the transitioned user equipment. The method may further include preventing changing of at least one identifier of the transitioned equipment. The identifier may include at least one of the following: a user equipment identifier, a user equipment bearer identifier, at least one user plane endpoint address, an internet protocol (IP) address, a GPRS tunneling protocol user data tunneling endpoint identifier (GTP-U TEID), and any combination thereof associated with at least one user equipment. The identifier may be stored in at least one database. At least one container may be configured to retrieve the identifier from the database, and assign the retrieved identifier to the transitioned user equipment. The database may store a mapping between the retrieved identifier and at least one container.

In some implementations, at least one predetermined threshold may include at least one of the following: a first threshold associated with increasing the processing capacity, a second threshold associated with decreasing the processing capacity, and any combination thereof. The comparing may include comparing at least one of: one or more user equipments having with a predetermined radio resource control (RRC) status and being associated with a first predetermined weight, a number of communications from the one or more user equipments processed by the one or more containers per a predetermined period of time, a throughput associated with the one or more containers, and any combination thereof, with at least one of the first threshold and the second threshold. In some implementations, changing of the assignment of the processing capacity may include at least one of: increasing, based on the comparing, the processing capacity upon exceeding the first threshold; and decreasing, based on the comparing, the processing capacity upon not exceeding the second threshold.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   determining a processing capacity being assigned to one or more containers in a plurality of containers of a cloud native radio access network for providing communication to at least one user equipment in a plurality of user equipments;
   comparing the determined processing capacity to at least one predetermined threshold in a plurality of predetermined thresholds; and
   determining, based on the comparing, whether to change an assignment of the processing capacity.

2. The method according to claim 1, further comprising changing the assignment of the processing capacity.

3. The method according to claim 1, wherein the one or more containers are associated with at least one of: at least one control plane component and at least user plane component of a centralized unit of a base station,
   wherein the determining whether to change the assignment of the processing capacity assigned includes at least one of the following: increasing a number of user equipments being processed by the at least one control plane component by increasing a number of containers providing communication to the user equipments, decreasing a number of user equipments being processed by the at least one control plane component by decreasing the number of containers providing communication to the user equipments, increasing a throughout capacity of the at least one user plane component by increasing the number of containers providing communication to the user equipments, decreasing a throughput capacity of the at least one user plane component by decreasing the number of containers providing communication to the user equipments, and any combinations thereof.

4. The method according to claim 1, wherein at least one of the determining the processing capacity, the comparing, and the determining whether to change the assignment of the processing capacity is performed by at least one base station in a wireless communication system.

5. The method according to claim 4, where the base station includes at least one of the following: a base station, an eNodeB base station, a gNodeB base station, a wireless base station, a wireless access point, and any combination thereof.

6. The method according to claim 5, wherein the base station is a base station operating in at least one of the following communications systems: a long term evolution communications system, a new radio communications system, a wireless communication system, and any combination thereof.

7. The method according to claim 4, wherein the base station includes at least one centralized unit, the centralized unit include at least one of: a control plane component, a user plane component, and any combination thereof.

8. The method according to claim 1, wherein one or more user equipments in the plurality of user equipments is associated with a radio resource control (RRC) status, the RRC status including at least one of the following: an RRC-inactive status, no RRC-inactive status, an RRC connected status, and any combination thereof.

9. The method according to claim 8, wherein one or more predetermined weights are assigned to the one or more user equipments in the plurality of user equipments based on the RRC status.

10. The method according to claim 9, wherein the at least one predetermined threshold is selected from a plurality of predetermined thresholds based on the RRC status of the one or more user equipments.

11. The method according to claim 10, wherein the comparing includes comparing the determined processing capacity determined for the one or more user equipments having assigned the one or more predetermined weights to the at least one predetermined threshold selected based on the RRC status of the one or more user equipments.

12. The method according to claim 1, further comprising
   transitioning, based on the determining whether to change the processing capacity, the at least one user equipment assigned to the at least one container to at least another container in the plurality of containers; and
   providing, using the at least another container, communication to the transitioned at least one user equipment.

13. The method according to claim 12, further comprising preventing, subsequent to the transitioning, the at least one container from providing communication to at least another user equipment in the plurality of user equipments.

14. The method according to claim 12, further comprising changing at least one identifier of the transitioned at least one user equipment.

15. The method according to claim 12, further comprising preventing changing at least one identifier of the transitioned at least one user equipment.

16. The method according to claim 14, wherein the at least one identifier includes at least one of the following: a user equipment identifier, a user equipment bearer identifier, at least one user plane endpoint address, an internet protocol (IP) address, a GPRS tunneling protocol user data tunneling endpoint identifier (GTP-U TEID), and any combination thereof associated with the at least one user equipment.

17. The method according to claim 16, wherein the at least one identifier is stored in at least one database, the one or more containers being configured to retrieve the at least one identifier from the at least one database, and assign the retrieved at least one identifier to the transitioned at least one user equipment.

18. The method according to claim 17, wherein the at least one database stores a mapping between the retrieved at least one identifier and the one or more containers.

19. The method according to claim 1, wherein the at least one predetermined threshold includes at least one of the following: a first threshold associated with increasing the processing capacity, a second threshold associated with decreasing the processing capacity, and any combination thereof.

20. The method according to claim 19, wherein the comparing includes comparing at least one of: one or more user equipments having with a predetermined radio resource control (RRC) status and being associated with a first predetermined weight, a number of communications from the one or more user equipments processed by the one or more containers per a predetermined period of time, a throughput associated with the one or more containers, and any combination thereof, with at least one of the first threshold and the second threshold.

21. The method according to claim 20, wherein the changing the assignment of the processing capacity includes at least one of:

increasing, based on the comparing, the processing capacity upon exceeding the first threshold; and
decreasing, based on the comparing, the processing capacity upon not exceeding the second threshold.

22. An apparatus, comprising:
at least one processor, and
at least one non-transitory storage media storing instructions that, when executed by the at least one processor, cause the at least one processor to perform operations comprising:
determining a processing capacity being assigned to one or more containers in a plurality of containers of a cloud native radio access network for providing communication to at least one user equipment in a plurality of user equipments;
comparing the determined processing capacity to at least one predetermined threshold in a plurality of predetermined thresholds; and
determining, based on the comparing, whether to change an assignment of the processing capacity.

23. At least one non-transitory storage media storing instructions that, when executed by at least one processor, cause the at least one processor to perform operations comprising:
determining a processing capacity being assigned to one or more containers in a plurality of containers of a cloud native radio access network for providing communication to at least one user equipment in a plurality of user equipments;
comparing the determined processing capacity to at least one predetermined threshold in a plurality of predetermined thresholds; and
determining, based on the comparing, whether to change an assignment of the processing capacity.

* * * * *